US010153812B2

(12) United States Patent
van Zelst et al.

(10) Patent No.: US 10,153,812 B2
(45) Date of Patent: Dec. 11, 2018

(54) TECHNIQUES FOR SUPPORTING MULTIPLE BANDWIDTH MODES

(71) Applicant: QUALCOMM Incorporated, San Diego, CA (US)

(72) Inventors: Albert van Zelst, Woerden (NL); Didier Johannes Richard van Nee, Tull en 't Waal (NL); Vincent Knowles Jones, IV, Redwood City, CA (US); Simon Jan Brand, Pleasanton, CA (US); Patrick Daniel Kelliher, Chelmsford, MA (US); MeeLan Lee, Los Altos, CA (US); Todd Daniel Antes, San Jose, CA (US); Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 14/618,881

(22) Filed: Feb. 10, 2015

(65) Prior Publication Data
US 2016/0233929 A1    Aug. 11, 2016

(51) Int. Cl.
*H04B 7/04* (2017.01)
*H04B 7/0413* (2017.01)
(Continued)

(52) U.S. Cl.
CPC ........... *H04B 7/0413* (2013.01); *H04L 5/001* (2013.01); *H04L 5/0041* (2013.01);
(Continued)

(58) Field of Classification Search
CPC ....... H04B 7/0413; H04B 7/0874; H04L 1/06; H04L 5/001; H04L 5/0041; H04L 5/0064;
(Continued)

(56) References Cited

U.S. PATENT DOCUMENTS 8,027,326 B2 * 9/2011 Shearer, III ............. H04L 5/023
370/210
8,180,392 B2  5/2012 Sekiya et al.
(Continued)

FOREIGN PATENT DOCUMENTS

EP            2131618 A2   12/2009
WO   WO-2004057899 A1    7/2004
(Continued)

OTHER PUBLICATIONS

Chris Pearson, "High-Speed, Analog-to-Digital Converter Basics", Jan. 2011, Application Note SLAA510, Texas Instruments.*
(Continued)

*Primary Examiner* — Jamal Javaid
(74) *Attorney, Agent, or Firm* — Holland & Hart LLP/Qualcomm

(57) ABSTRACT

A method for wireless communication is described herein. The method may include advertising support by a wireless device for a first bandwidth mode and a second bandwidth mode, wherein the first bandwidth mode utilizes a single channel and the second bandwidth mode utilizes channel bonding between a plurality of channels. The method may also include switching a current bandwidth mode of the wireless device from one of the bandwidth modes to the other of the bandwidth modes and adjusting a number of multiple-input, multiple-output (MIMO) spatial streams supported by the wireless device in response to the switching.

26 Claims, 16 Drawing Sheets

(51) Int. Cl.
*H04L 5/00* (2006.01)
*H04W 16/06* (2009.01)
*H04W 28/20* (2009.01)
*H04L 1/06* (2006.01)
*H04W 72/04* (2009.01)

(52) U.S. Cl.
CPC .......... *H04L 5/0064* (2013.01); *H04L 5/0098* (2013.01); *H04W 16/06* (2013.01); *H04W 28/20* (2013.01); *H04L 1/06* (2013.01); *H04W 72/048* (2013.01)

(58) Field of Classification Search
CPC .... H04L 5/0098; H04W 16/06; H04W 28/20; H04W 72/048; H04W 72/0493
See application file for complete search history.

(56) References Cited

U.S. PATENT DOCUMENTS

| | | | |
|---|---|---|---|
| 8,625,561 B2 | 1/2014 | Zhang | |
| 2006/0240816 A1 | 10/2006 | Sutardja | |
| 2010/0222007 A1 | 9/2010 | Rao et al. | |
| 2010/0303024 A1 | 12/2010 | Gossain | |
| 2012/0140646 A1 | 6/2012 | Stephens | |
| 2013/0010719 A1* | 1/2013 | Shapira | H04W 72/082 370/329 |
| 2013/0095816 A1* | 4/2013 | Gerstenberger | H04W 72/0406 455/422.1 |
| 2013/0171941 A1 | 7/2013 | Kenney et al. | |
| 2013/0194944 A1 | 8/2013 | Soyak et al. | |
| 2013/0336242 A1* | 12/2013 | Rajagopal | H04W 72/0453 370/329 |
| 2013/0336306 A1* | 12/2013 | Sohn | H04B 7/0877 370/338 |
| 2014/0050156 A1 | 2/2014 | Chan et al. | |
| 2014/0098748 A1 | 4/2014 | Chan et al. | |
| 2014/0226762 A1 | 8/2014 | Maltsev et al. | |
| 2014/0241335 A1 | 8/2014 | Chen et al. | |
| 2014/0254494 A1 | 9/2014 | Clegg | |
| 2014/0378179 A1 | 12/2014 | Nagai et al. | |
| 2015/0271829 A1 | 9/2015 | Amini et al. | |
| 2015/0373587 A1 | 12/2015 | Josiam et al. | |
| 2016/0081089 A1* | 3/2016 | Suzuki | H04W 72/0453 370/343 |
| 2016/0233931 A1 | 8/2016 | Van Zelst et al. | |
| 2016/0249357 A1 | 8/2016 | Green et al. | |

FOREIGN PATENT DOCUMENTS

| | | |
|---|---|---|
| WO | WO-2010138290 A1 | 12/2010 |
| WO | WO-2014048801 A1 | 4/2014 |

OTHER PUBLICATIONS

IEEE Std 802.11ac-2013, "Local and Metropolitan Area Networks—Amendment 4: Enhancements", IEEE 2013, pp. 104 and 113.*

ISA/EPO, International Search Report and Written Opinion of the International Searching Authority, Int'l. App. No. PCT/US2016/012598, dated Apr. 6, 2016, European Patent Office, Rijswijk, NL, 13 pgs.

Park, "IEEE 802.11ac: Dynamic Bandwidth Channel Access," 2011 IEEE International Conference on Communications (ICC), Kyoto, Jun. 5-9, 2011, 5 pgs., XP_31908841A, Institute of Electrical and Electronics Engineers.

Rajagopal, "Power Efficiency: The Next Challenge for Multi-Gigabit-Per-Second Wi-Fi", Future of Wi-Fi, IEEE Communications Magazine, vol. 52, Issue 11, Nov. 2014, pp. 40-45, XP_11564612A, Institute of Electrical and Electronics Engineers.

* cited by examiner

TECHNIQUES FOR SUPPORTING MULTIPLE BANDWIDTH MODES

BACKGROUND

Field of the Disclosure

The present disclosure, for example, relates to wireless communication systems, and more particularly to wireless devices capable of supporting multiple bandwidth modes.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point (AP) that may communicate with one or more stations (STAs) or mobile devices. The AP may be coupled to a network, such as the Internet, and enable a mobile device to communicate via the network (and/or communicate with other devices coupled to the access point).

A wireless network may define multiple bandwidth modes specifying the bandwidth of channels used by wireless devices (e.g., 20 MHz, 40 MHz, 80 MHz, etc.) to communicate over the network. Some networks may permit the combination of multiple channels using channel bonding to allow for operation over a bandwidth that is larger than that of a single channel. Because some wireless devices may switch between these bandwidth modes, there is a need to efficiently leverage hardware in a wireless device to provide support for multiple bandwidth modes. Additionally, as the number and type of bandwidth modes supported by wireless devices increases, there is a need to provide support for new bandwidth modes while maintaining backwards compatibility with legacy bandwidth modes.

SUMMARY

The present disclosure is directed to techniques, devices, and systems for supporting bandwidth modes utilizing channel bonding while also providing backwards compatibility with legacy bandwidth modes. Specifically, a wireless device may advertise support for a first bandwidth mode that utilizes a single channel and a second bandwidth mode that utilizes channel bonding between multiple channels (e.g., channel bonding of two 80 MHz channels to operate over 160 MHz of total bandwidth). When the wireless device switches from one of the bandwidth modes to the other of the bandwidth modes, the wireless device may adjust a number of multiple-input, multiple-output (MIMO) spatial streams supported by the wireless device in response to the switching.

If the second bandwidth mode has a total bandwidth that is n times greater than the first bandwidth mode, with n being a positive integer, switching from the first bandwidth mode to the second bandwidth mode may involve reducing the number of MIMO spatial streams supported by the wireless device by 1/n. Similarly, switching from the second bandwidth mode to the first bandwidth mode may involve increasing the number of MIMO spatial streams supported by the wireless device by a factor of n. Using this technique and others described herein, support for the second bandwidth mode may be provided without, or with only modest, increases in the number of hardware components or complexity of the circuits in the wireless device beyond what is used to support the first bandwidth mode.

A method of wireless communication is disclosed, the method including advertising support by a wireless device for a first bandwidth mode and a second bandwidth mode. The first bandwidth mode may utilize a single channel and the second bandwidth mode may utilize channel bonding between a plurality of channels. The method may further include switching a current bandwidth mode of the wireless device from one of the bandwidth modes to the other of the bandwidth modes, and adjusting a number of MIMO spatial streams supported by the wireless device in response to the switching.

Switching the current bandwidth mode of the wireless device may include switching from the first bandwidth mode to the second bandwidth mode and adjusting the number of MIMO spatial streams includes reducing the number of MIMO spatial streams supported by the wireless device. Switching the current bandwidth mode of the wireless device may additionally or alternatively include switching from the second bandwidth mode to the first bandwidth mode and adjusting the number of MIMO spatial streams includes increasing the number of MIMO spatial streams supported by the wireless device.

The number of MIMO spatial streams may be adjusted in proportion to an increase or decrease in bandwidth associated with switching the current bandwidth mode of the wireless device. Sampling rates of one or more analog-to-digital converters (ADCs) of the wireless device may be adjusted in response to the switching. In some examples, adjusting the sampling rates of the one or more ADCs may include doubling the sampling rates in response to switching the current bandwidth mode from the first bandwidth mode to the second bandwidth mode or halving the sampling rates in response to switching the current bandwidth mode from the second bandwidth mode to the first bandwidth mode.

Switching the current bandwidth mode of the wireless device may include adjusting a number of synthesizers used by the wireless device. Additionally or alternatively, a number of receive chains used for the plurality of channels may be adjusted based on a listening mode or a data demodulation mode. For example, adjusting the number of receive chains includes one of increasing a number of receive chains used for a primary channel of the plurality of channels and decreasing a number of receive chains used for a secondary channel of the plurality of channels, or decreasing the number of receive chains used for the primary channel and increasing the number of receive chains used for the secondary channel. The method may further include receiving a data packet at the wireless device, wherein switching the current bandwidth mode happens in one of a symbol after the wireless device determines a packet format of the data packet and in a symbol used for updating a gain level. A management message may indicate the listening mode to a physical layer (PHY), wherein the method further includes adjusting a configuration of a receiver of the wireless device for reception of an expected data packet type based on the management message.

The wireless device may be a first wireless device, and the method may include determining that an acknowledgement having a bandwidth equal to or less than a bandwidth of the single channel is expected at the first wireless device from a second wireless device. The method may also include adjusting a number of receive chains used for the single channel in response to the determination and based on a management message that indicates a parameter from the group consisting of: the number of receive chains used for the single channel to a PHY and a number of frequency segments associated with a listen mode.

Advertising support by the wireless device for the first bandwidth mode and the second bandwidth mode may include signaling a response frame including an operating mode notification (OMN) element. The OMN element may indicate a parameter selected from the group consisting of an operating bandwidth of the single channel and the number of MIMO spatial streams supported by the wireless device.

An apparatus for wireless communication is described. In one configuration, the apparatus may include a transceiver to advertise support by a wireless device for a first bandwidth mode and a second bandwidth mode, wherein the first bandwidth mode utilizes a single channel and the second bandwidth mode utilizes channel bonding between a plurality of channels. The apparatus may also include a bandwidth selector to switch a current bandwidth mode of the wireless device from one of the bandwidth modes to the other of the bandwidth modes. The apparatus may further include a spatial stream component to adjust a number of MIMO spatial streams supported by the wireless device in response to the switching. These components may perform one or more aspects of the method described above.

An apparatus for wireless communication is described. In one configuration, the apparatus may include means for advertising support by a wireless device for a first bandwidth mode and a second bandwidth mode, wherein the first bandwidth mode utilizes a single channel and the second bandwidth mode utilizes channel bonding between a plurality of channels. The apparatus may also include means for switching a current bandwidth mode of the wireless device from one of the bandwidth modes to the other of the bandwidth modes. The apparatus may further include means for adjusting a number of MIMO spatial streams supported by the wireless device in response to the switching. The apparatus may perform one or more aspects of the method described above.

A non-transitory computer-readable medium storing computer-executable code for wireless communication is described. In one configuration, the computer-executable code may be executable by a processor to cause a wireless device to advertise support for a first bandwidth mode and a second bandwidth mode, wherein the first bandwidth mode utilizes a single channel and the second bandwidth mode utilizes channel bonding between a plurality of channels. The code may also be executable by the processor to switch a current bandwidth mode of the wireless device from one of the bandwidth modes to the other of the bandwidth modes. The code may further be executable by the processor to adjust a number of MIMO spatial streams supported by the wireless device in response to the switching. The code may cause the wireless device to perform one or more aspects of the method described above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
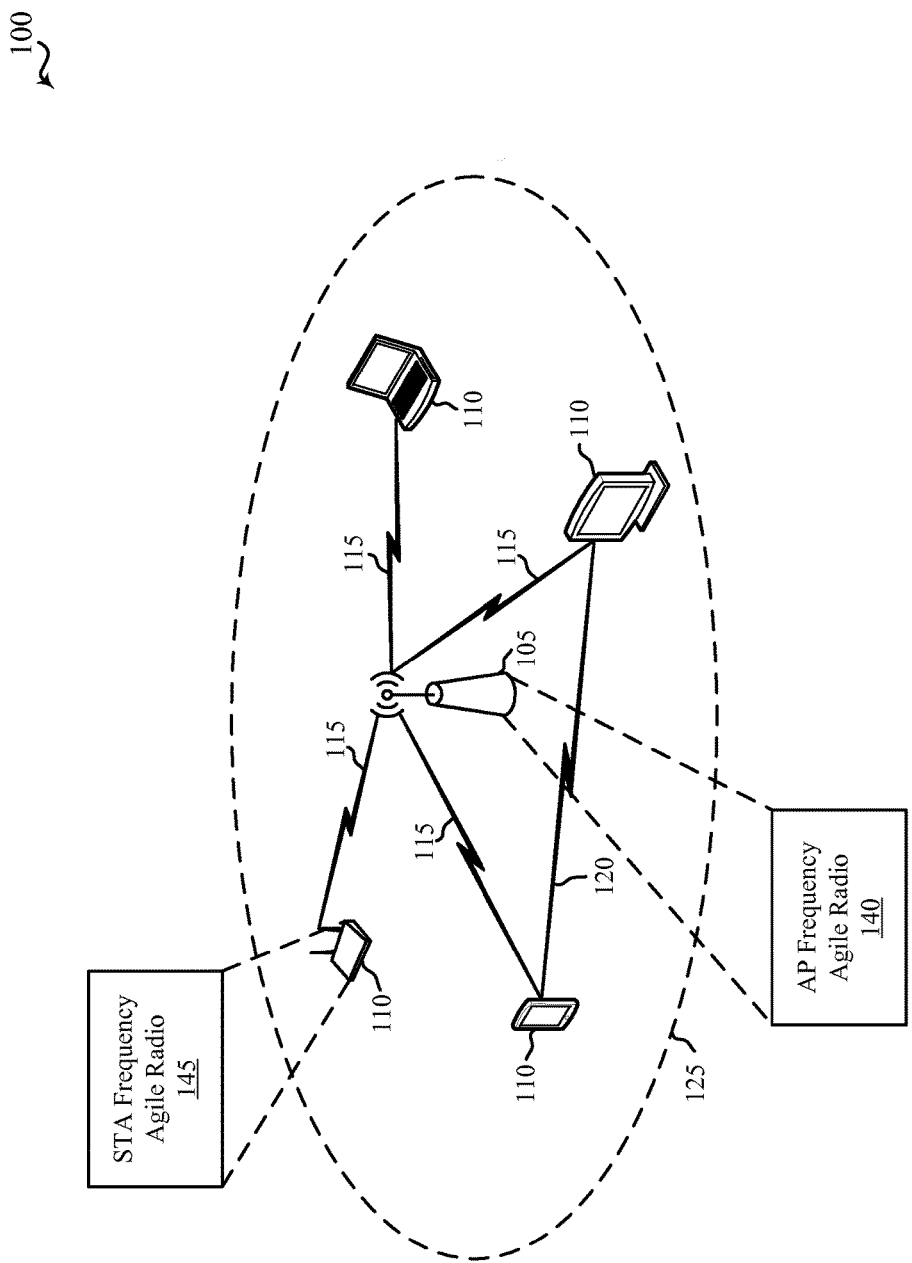
FIG. 1 shows a diagram of a wireless communication system, in accordance with various aspects of the present disclosure.

A wireless device may communicate using multiple bandwidth modes. New wireless devices and wireless protocols may be capable of using different bandwidths that previously were not used. Techniques, devices, and systems described herein provide support for additional bandwidth modes while also providing backwards compatibility for legacy bandwidth modes.

The present disclosure is directed to techniques, devices, and systems for supporting bandwidth modes utilizing channel bonding while also providing backwards compatibility with legacy bandwidth modes. Specifically, a wireless device may advertise support for a first bandwidth mode that utilizes a single channel and a second bandwidth mode that utilizes channel bonding between multiple channels (e.g., channel bonding of two 80 MHz channels to operate over 160 MHz of total bandwidth). When the wireless device switches from one of the bandwidth modes to the other of the bandwidth modes, the wireless device may adjust a number of multiple-input, multiple-output (MIMO) spatial streams supported by the wireless device in response to the switching.

For example, if the second bandwidth mode has a total bandwidth that is n times greater than the first bandwidth mode, with n being a positive integer, switching from the first bandwidth mode to the second bandwidth mode may involve reducing the number of MIMO spatial streams supported by the wireless device by 1/n. Similarly, switching from the second bandwidth mode to the first bandwidth mode may involve increasing the number of MIMO spatial streams supported by the wireless device by a factor of n. Using this technique and others described herein, support for the second bandwidth mode may be provided without increasing the number of hardware components or complexity of the circuits in the wireless device beyond what is used to support the first bandwidth mode. In other examples, support for the second bandwidth mode may be achieved using techniques described herein with minor increases to the number of hardware components or circuit complexity.

Three options are described herein for a wireless device to support an additional 160 MHz bandwidth mode using two spatial streams while supporting 20, 40, and 80 MHz bandwidth modes. The wireless device may also support an 80+80 MHz and a 165 MHz bandwidth mode. The wireless device may utilize channel bonding in order to combine smaller segments (e.g., 80 MHz) into a larger (e.g., 160 MHz) channel. In a first option, a synthesizer for each segment is used in the one or more transceivers to combine two segments into a larger segment. In a second option, two analog-to-digital converters (ADCs) are used in the radio frequency (RF) chains at a different sampling rate in order to create a larger channel. In one example, the sampling rate of the ADCs is doubled (e.g., 160 is doubled to 320 Msps). In a third option, two synthesizers and increased ADC speeds may be used.

Throughout this description, the bandwidth modes supported by the IEEE 802.11ac standard are discussed as an example. However, the techniques and devices described herein may extend to other standards and other bandwidths. The IEEE 802.11ac standard defines a 160 MHz bandwidth mode consisting of two 80 MHz sub-channels (i.e., frequency segments) where each sub-channel has the same number of tones and pilots as a single 80 MHz 11ac channel. Other bandwidth modes supported by the IEEE 802.11ac standard include a 20 MHz bandwidth mode, a 40 MHz bandwidth mode, and an 80 MHz bandwidth mode. As used throughout the description, a wireless device may refer to either an access point or a wireless device.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a WLAN network 100 such as, e.g., a network implementing at least one of the IEEE 802.11 family of standards. The WLAN network 100 may include an access point (AP) 105 and one or more wireless devices 110 or stations (STAs), such as mobile stations, personal digital assistants (PDAs), other handheld devices, netbooks, notebook computers, tablet computers, laptops, display devices (e.g., TVs, computer monitors, etc.), printers, and the like. While only one AP 105 is illustrated, the WLAN network 100 may have multiple APs 105. Each of the wireless devices 110, which may also be referred to as mobile stations (MSs), mobile devices, access terminals (ATs), user equipment (UE), subscriber stations (SSs), or subscriber units, may associate and communicate with an AP 105 via a communication link 115. Each AP 105 has a geographic coverage area 125 such that wireless devices 110 within that area can typically communicate with the AP 105. The wireless devices 110 may be dispersed throughout the geographic coverage area 125. Each wireless device 110 may be stationary or mobile.

A wireless device 110 can be covered by more than one AP 105 and can therefore associate with one or more APs 105 at different times. A single AP 105 and an associated set of stations may be referred to as a basic service set (BSS). An extended service set (ESS) is a set of connected BSSs. A distribution system (DS) is used to connect APs 105 in an extended service set. A geographic coverage area 125 for an access point 105 may be divided into sectors making up only a portion of the coverage area. The WLAN network 100 may include access points 105 of different types (e.g., metropolitan area, home network, etc.), with varying sizes of coverage areas and overlapping coverage areas for different technologies. In other examples, other wireless devices can communicate with the AP 105.

While the wireless devices 110 may communicate with each other through the AP 105 using communication links 115, each wireless device 110 may also communicate directly with one or more other wireless devices 110 via a direct wireless link 120. Two or more wireless devices 110 may communicate via a direct wireless link 120 when both wireless devices 110 are in the AP geographic coverage area 125 or when one or neither wireless device 110 is within the AP geographic coverage area 125. Examples of direct wireless links 120 may include Wi-Fi Direct connections, connections established by using a Wi-Fi Tunneled Direct Link Setup (TDLS) link, and other P2P group connections. The wireless devices 110 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, and the like. In other implementations, other peer-to-peer connections and/or ad hoc networks may be implemented within WLAN network 100.

The AP 105 may include an AP frequency agile radio 140. A frequency agile radio is a transceiver that can dynamically change bandwidth modes. The bandwidth modes may utilize different frequency channels, and may include an 80 MHz mode, an 80+80 MHz mode, a 160 MHz contiguous mode, and a 165 MHz mode. In other examples, other bandwidth modes may be used. The AP 105 may communicate with the wireless devices 110 or other APs over different bandwidths using the AP frequency agile radio 140.

At least one of the wireless devices 110 may also include a station frequency agile radio 145. The STA frequency agile radio 145 can also dynamically change bandwidth modes to communicate with another wireless device 110 or the AP 105 over a selected bandwidth mode. The selected bandwidth mode may be, for example, the 80 MHz mode, the 80+80 MHz mode, the 160 MHz mode, and the 165 MHz mode. In other examples, the STA frequency agile radio 145 may use other bandwidth modes.

In some examples, the AP frequency agile radio 140 and the STA frequency agile radio 145 may conform to the second release of the 802.11ac standard. The AP frequency agile radio 140 and the STA frequency agile radio 145 may also be backwards compatible with the first release of the 802.11ac standard.

Several different options are described herein for achieving channel bonding to create a larger segment out of two smaller segments. In one option, the wireless device may use synthesizers (e.g., one synthesizer for each receive chain or a set of receive chains tuned to the same segment) to combine two 80 MHz segments into a two spatial stream 80+80 MHz segment. In another option, the wireless device may have increased sampling rates of one or more ADCs to capture the entire 160 MHz channel. Alternatively, the wireless device may use a combination of synthesizers and increased sampling rates of ADCs in order to have a larger bandwidth, including the 80+80 as well as the 160 MHz segments.

Figure 2:
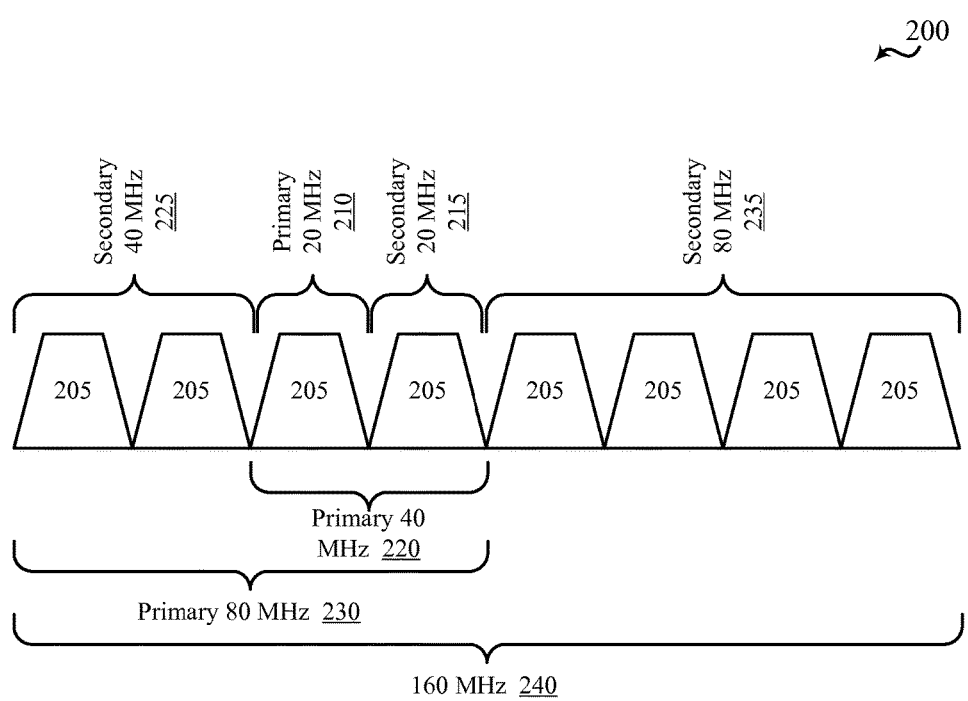
FIG. 2 shows a conceptual diagram of an example channelization for a wireless communication system, in accordance with various aspects of the present disclosure.

FIG. 2 shows a conceptual diagram of an example channelization 200 for a wireless communication system, in accordance with various aspects of the present disclosure. The channelization 200 may define the available channels for the wireless communication. In this example, the wireless communication system may be between any combination of APs 105 and wireless devices 110 described with reference to FIG. 1. That is, an AP 105 or a wireless device 110 may use the channelization 200 for wireless communications.

In the example of FIG. 2, the channelization 200 includes eight 20 MHz sub-channels 205. The channelization 200 may include a primary 20 MHz channel 210, a secondary 20 MHz channel 215, a primary 40 MHz channel 220, a secondary 40 MHz channel 225, a primary 80 MHz channel 230, and a secondary 80 MHz channel 235. Typically in 802.11 ac, an AP 105 selects a channel bandwidth, such as 80 MHz, and when wireless devices 110 connect to the AP 105, the use of sub-channels may be as follows: a 20 MHz wireless device 110 will communicate with the AP 105 over the primary 20 MHz channel 215; a 40 MHz wireless device 110 will communicate with the AP 105 over the primary 20 MHz channel 215 when sending 20 MHz packets and over the primary 40 MHz channel 220 when sending 40 MHz packets; an 80 MHz wireless device 110 will communicate with the AP 105 over the primary 20 MHz channel 215 when sending 20 MHz packets, over the primary 40 MHz channel 220 when sending 40 MHz, and over the primary 80 MHz channel 230 when sending 80 MHz packets.

However, devices and techniques described herein support a channelization 200 also having a 160 MHz channel 240. The 160 MHz channel 240 may include all eight 20 MHz sub-channels 205. The 160 MHz channel 240 may include both of the 80 MHz channels 230, 235. When the 160 MHz channel 240 is selected, the AP 105 or the wireless device 110 may communicate using 160 MHz. The 160 MHz channel 240 may use a simple extension to the channel access rules applicable for 80 MHz channels 230, 235. Channel bonding may be used to combine sub-channels into larger channels, such as the 160 MHz channel 240.

The sub-channels 205 may be contiguous in frequency or may be separated in frequency. In some examples, two or more smaller channels (i.e., frequency segments) that are discontiguous (i.e., separated by a frequency gap) may be combined to create a larger channel, via a frequency synthesizer, for example. An example of this includes a 160 MHz channel made out of two 80 MHz channels, such as the primary 80 MHz channel 230 and the secondary 80 MHz channel 235, where the 80 MHz channels 230, 235 are separated by a frequency gap. Such a 160 MHz channel may be referred to as an 80+80 channel.

The channels 205-240 may be used with different numbers of spatial streams (ss), depending on how many spatial streams the AP 105 or wireless device 110 supports. For example, the primary 80 MHz channel 230 may be used with two or four spatial streams. Likewise, the secondary 80 MHz channel 235 may be used with two or four spatial streams. The 160 MHz channel 240 may use one or two spatial streams. Similarly, the 80+80 channel may use two spatial streams.

The example of FIG. 2 illustrates specific 20 MHz sub-channels 205 being used for each of the bandwidth modes. However, in other examples, sub-channels with bandwidths other than 20 MHz may be used to make up the various bandwidth modes. An AP 105 may select which sub-channels 205 to use as a primary channel. The primary channel may be used as a control channel and for the lowest bandwidth transmissions. In some examples, as long as the primary channel is defined, the other sub-channels will be known by the AP 105 and the wireless devices 110 in communication with the AP 105.

Figure 3:
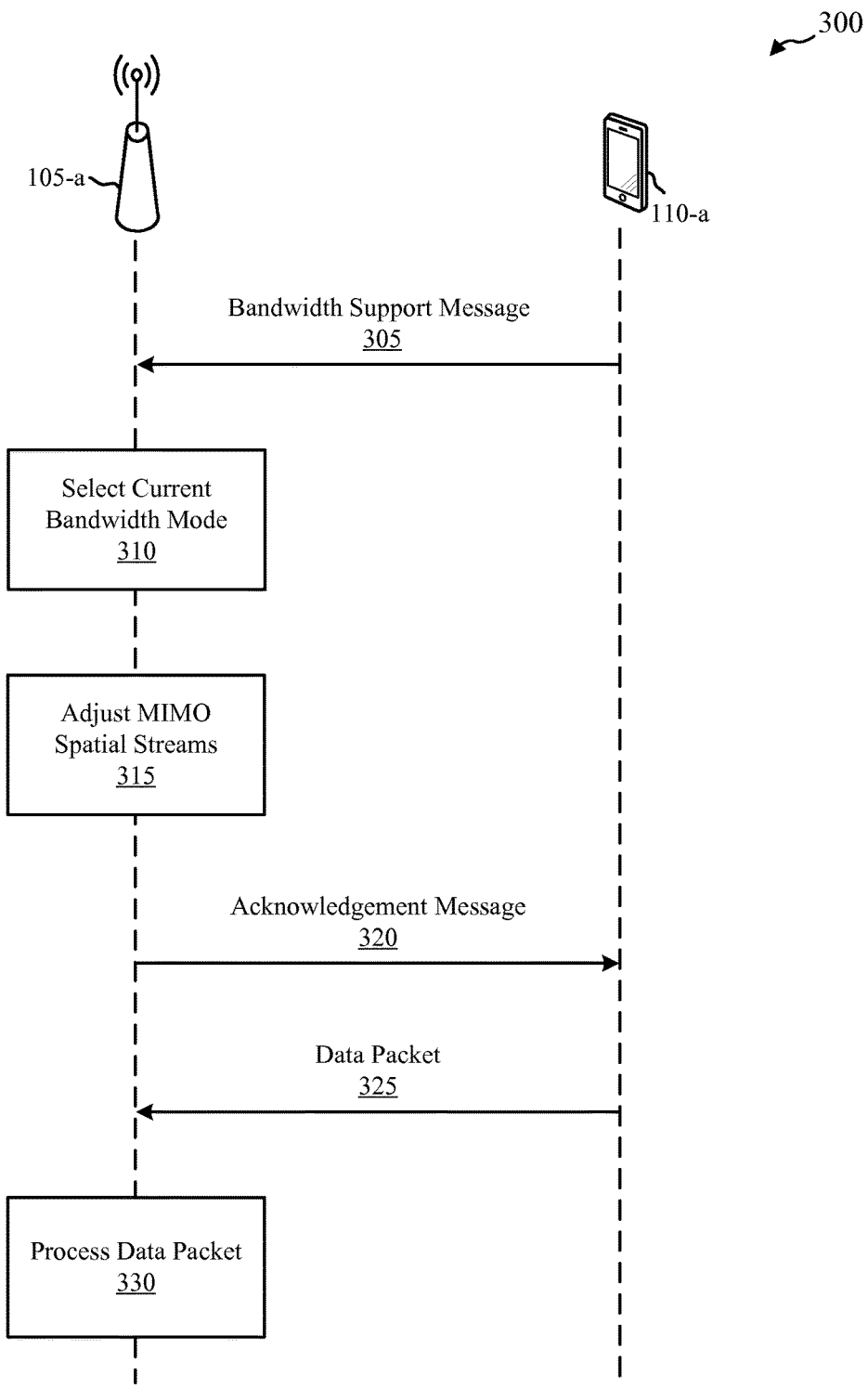
FIG. 3 shows a flow diagram illustrating an example bandwidth mode selection in a wireless communication system, in accordance with various aspects of the present disclosure.

FIG. 3 shows a flow diagram illustrating an example bandwidth mode selection in a wireless communication system 300, in accordance with various aspects of the present disclosure. In this example, an access point 105-*a* selects a current bandwidth mode based on a bandwidth of a wireless device 110-*a*. The access point 105-*a* may be an example of one or more aspects of the AP 105 described with reference to FIG. 1. Similarly, the wireless device 110-*a* may be an example of one or more aspects of the wireless devices 110 described with reference to FIG. 1.

The wireless device 110-*a* transmits a bandwidth support message 305 to the AP 105-*a* when the wireless device 110-*a* wishes to communicate with the AP 105-*a*. The bandwidth support message 305 may advertise support by the wireless device 110-*a* for at least a first bandwidth mode and a second bandwidth mode. For example, the bandwidth support message 305 may advertise that the wireless device 110-*a* may support an 80 MHz bandwidth mode and a 160 MHz bandwidth mode. In some examples, the bandwidth support message 305 may identify that the wireless device 110-*a* supports the 160 MHz bandwidth mode, and may be presumed to also support a second bandwidth mode, such as the 80 MHz bandwidth mode. In some examples, the bandwidth identification message 310 may identify a selected bandwidth that the wireless device 110-*a* intends to use. In some examples, the wireless device 110-*a* may send the bandwidth identification message 310 in response to receiving a signal from the AP 105-*a*.

The AP 105-*a* may determine a bandwidth mode to use to communicate with the wireless device 110-*a* based at least in part on a bandwidth mode identified as supported in the received bandwidth support message 305. If the AP 105-*a* supports the identified bandwidth mode, the AP 105-*a* selects a current bandwidth mode to be the identified bandwidth mode at block 310. The AP 105-*a* may restrict communications with the wireless device 110-*a* to only those modes identified as supported by the wireless device 110-*a*. The AP 105-*a* may communicate using other bandwidth modes with other wireless devices 110 associated with the AP 105-*a*. However, the AP 105-*a* may not exceed a current channel bandwidth selected for the BSS of which the AP 105-*a* is a part.

If needed, the AP 105-*a* may adjust the number of MIMO spatial streams used for the selected current bandwidth mode at block 315. For example, the AP 105-*a* may adjust the number of MIMO spatial streams used to two or four spatial streams dedicated to the current bandwidth mode.

In some examples, the AP 105-*a* may send an acknowledgment message 320 to the wireless device 110-*a* that informs the wireless device 110-*a* of the bandwidth mode to use to communicate with the AP 105-*a*. For example, the acknowledgment message 320 may indicate that the wireless device 110-*a* may operate in the identified bandwidth mode identified in the bandwidth support message 305. In other examples, the AP 105-*a* does not send the acknowledgement message 320.

The wireless device 110-*a* may send one or more data packets 325 over the current bandwidth mode to the AP 105-*a*. For example, the one or more data packets 325 may be sent using a 160 MHz channel if that is the channel that is currently being used. The AP 105-*a* may process the one or more data packets at block 330. The AP 105-*a* and the wireless device 110-*a* may support per-packet switching. That is, depending on medium availability, the AP 105-*a* may choose a bandwidth mode from packet to packet. For example, the AP 105-*a* may select to use the 80 MHz channel bandwidth (e.g., with a maximum of up to four spatial streams) for a first packet and then may switch to another bandwidth mode, such as the 80+80 MHz (e.g., with a maximum of up to two spatial streams).

FIG. 3 is illustrated as the AP 105-*a* announcing the bandwidth capabilities and selecting a current bandwidth mode. However, in other examples, the wireless device 110-*a* may perform the role attributed to the AP 105-*a* in FIG. 3. Similarly, the AP 105-*a* may send a bandwidth identification message to the wireless device 110-*a* or to another AP 105.

Figure 4:
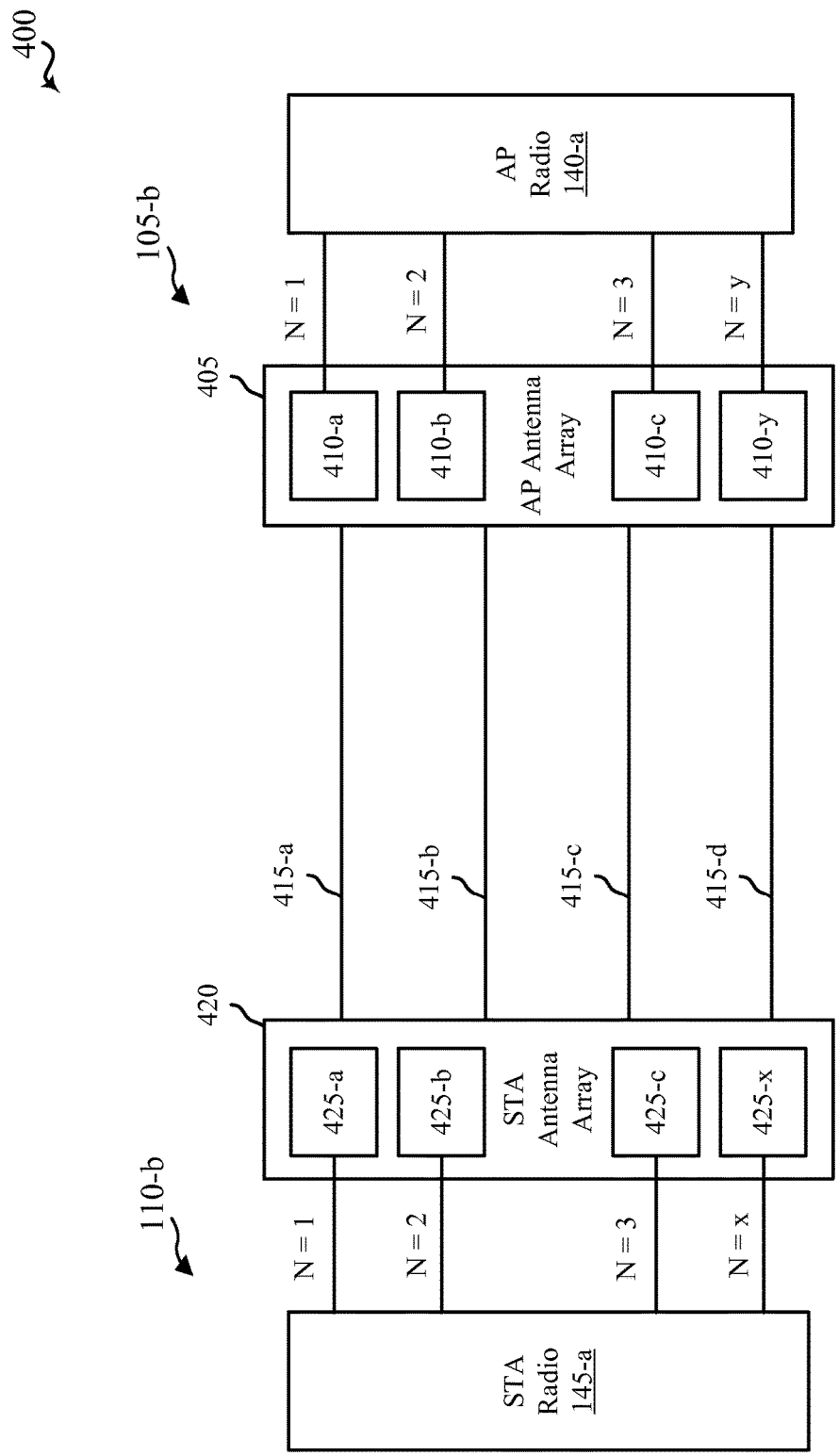
FIG. 4 shows a conceptual diagram of an example wireless communication system operating with four spatial streams, in accordance with various aspects of the present disclosure.

FIG. 4 shows a conceptual diagram of an example wireless communication system 400 operating with four spatial streams 415-*a*, 415-*b*, 415-*c*, and 415-*d* (collectively referred to herein as "spatial streams 415"), in accordance with various aspects of the present disclosure. A wireless device 110-*b* communicates with an access point 105-*b* over the spatial streams 415 according to a current bandwidth mode. The access point 105-*b* may be an example of one or more aspects of the AP 105 described with reference to FIGS. 1 and 3. The wireless device 110-*b* may be an example of one or more aspects of the wireless devices 110 described with reference to FIGS. 1 and 3.

The wireless device 110-*b* includes a station frequency agile radio 145-*a* and a STA antenna array 420. The STA frequency agile radio 145-*a* may be an example of one or more aspects of the STA frequency agile radio 145 of FIG. 1. The STA antenna array 420 may include a number, x, of antennas, including antennas 425-*a*, 425-*b*, 425-*c*, up to 425-*x*, wherein x can be any number of supported antennas. The wireless device 110-*b* also includes x number of receive chains N. For example, a receive chain N=1 is coupled to the antenna 425-*a*, a receive chain N=2 is coupled to the antenna 425-*b*, a receive chain N=3 is coupled to the antenna 425-*c*, and a receive chain N=x is coupled to the antenna 425-*x*.

Similarly, the AP 105-*b* includes an AP radio 140-*a* and an AP antenna array 405. The AP radio 140-*a* may be an example of one or more aspects of the AP frequency agile radio 140 of FIG. 1. The AP antenna array 405 may include a number, y, of antennas 410, including antennas 410-*a*, 410-*b*, 410-*c*, up to 410-*y*, wherein y can be any number of supported antennas. The AP 105-*b* also includes y number of receive chains N. For example, a receive chain N=1 is coupled to the antenna 410-*a*, a receive chain N=2 is coupled to the antenna 410-*b*, a receive chain N=3 is coupled to the antenna 410-*c*, and a receive chain N=y is coupled to the antenna 410-*y*. The numbers x and y may be the same number or different numbers.

The wireless device 110-*b* communicates with the AP 105-*b* over the four spatial streams 415. The wireless device 110-*b* and the AP 105-*b* may use the spatial streams for one or more channels. For example, the AP 105-*b* and the wireless device 110-*b* may use the 4 spatial streams for an 80 MHz channel for multi-user MIMO. In some examples, the four spatial steams may be used for different channel combinations. The wireless device 110-*b* and the AP 105-*b* may also have a channel for listening.

Figure 5:
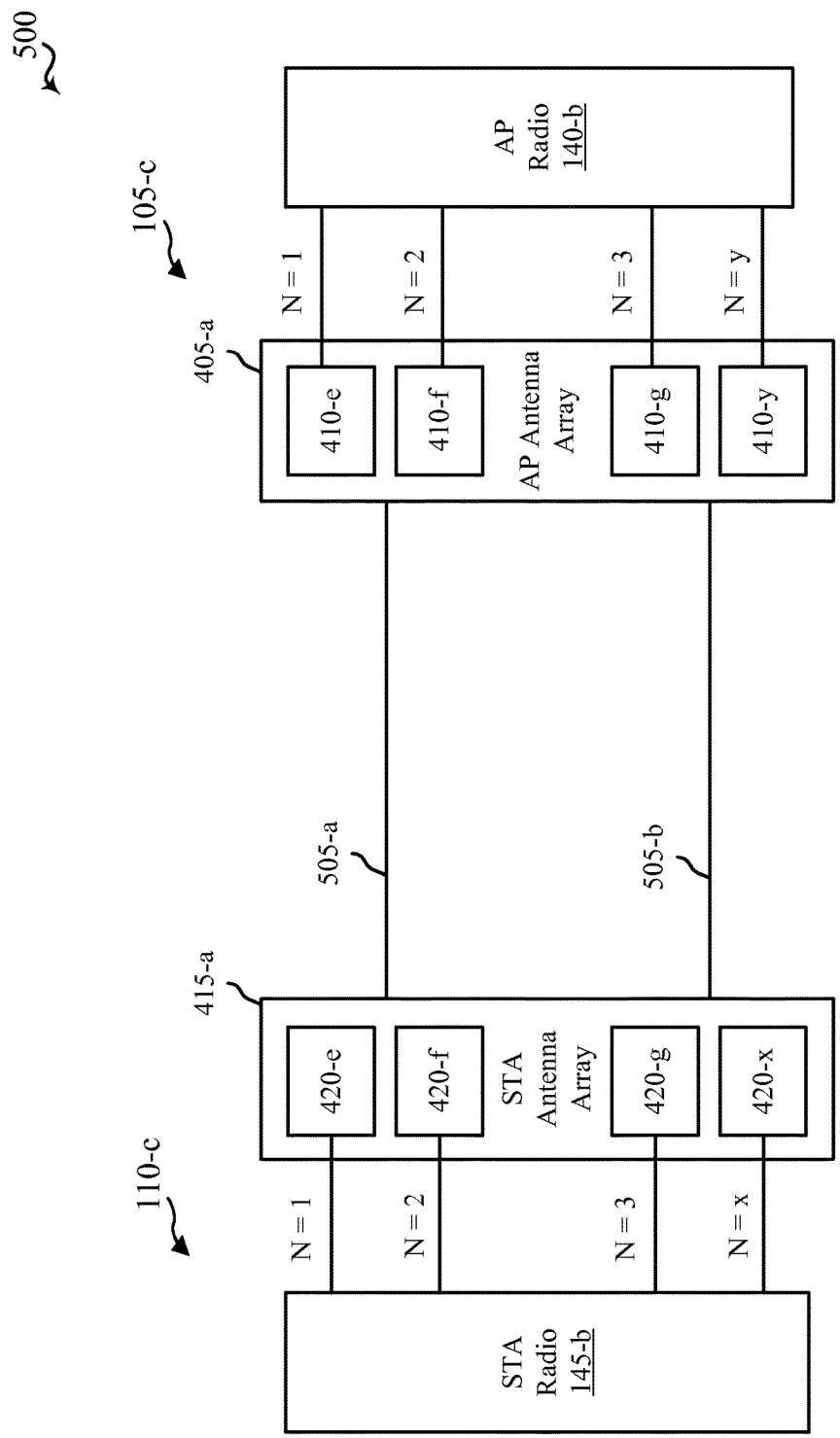
FIG. 5 shows a conceptual diagram of an example wireless communication system operating with two spatial streams, in accordance with various aspects of the present disclosure.

FIG. 5 shows a conceptual diagram 500 of an example wireless communication system operating with two spatial streams 505-*a* and 505-*b* (collectively referred to herein as "spatial streams 505"), in accordance with various aspects of the present disclosure. A wireless device 110-*c* communicates with an access point 105-*c* over the spatial streams 505 according to a current bandwidth mode. The access point 105-*c* may be an example of one or more aspects of the AP 105 described with reference to FIGS. 1 and 3-4. The wireless device 110-*c* may be an example of one or more aspects of the wireless devices 110 described with reference to FIGS. 1 and 3-4.

The wireless device 110-*c* includes a station frequency agile radio 145-*b* and a STA antenna array 420-*a*. The STA frequency agile radio 145-*b* may be an example of one or more aspects of the STA frequency agile radio 145 of FIGS. 1 and 4. The STA antenna array 420 may be an example of one or more aspects of the STA antenna array 420 of FIG. 4. The STA antenna array 420-*a* may include a number, x, of antennas 425, including antennas 425-*e*, 425-*f*, 425-*g*, up to 425-*x*, wherein x can be any number of supported antennas. The wireless device 110-*c* also includes x number of receive chains N.

Similarly, the AP 105-*c* includes an AP radio 140-*b* and an AP antenna array 405-*a*. The AP radio 140-*b* may be an example of one or more aspects of the AP frequency agile radio 140 of FIGS. 1 and 4. The AP antenna array 405-*a* may be an example of one or more aspects of the AP antenna array 405 of FIG. 4. The AP antenna array 405-*a* may include a number, y, of antennas 410, including antennas 410-*e*, 410-*f*, 410-*g*, up to 410-*y*, wherein y can be any number of supported antennas. The AP 105-*b* also includes y number of receive chains N.

The wireless device 110-*c* communicates with the AP 105-*c* over the two spatial streams 505. The wireless device 110-*c* and the AP 105-*c* may use the spatial streams for one or more channels. The number of spatial streams that the wireless device 110-*c* and the AP 105-*c* use may depend on the current bandwidth mode. For example, the AP 105-*c* and the wireless device 110-*c* may use the two spatial streams 505 for a 160 MHz channel. In examples where the wireless device 110-c and the AP 105-c may communicate over two or four spatial streams, four spatial streams in 80 MHz and two spatial streams in 160 MHz may be used by dedicating two chains to the lower 80 MHz segment and two chains to the upper 80 MHz segment.

In some examples, the AP 105-c and the wireless device 110-c may advertise support for different bandwidth modes by signaling a response frame including an operating mode notification (OMN) element. An OMN element transmitted by the AP 105-c may indicate, for example, that the AP 105-c is using the 80 MHz bandwidth mode or the 160 MHz bandwidth mode. The OMN element may also indicate a number of MIMO spatial streams supported by the AP 105-c. In some examples, including an OMN element in an association response frames does not imply that an OMN element needs to also be included in a beacon. This allows the OMN element to be targeted to a specific client wireless device instead of all client wireless devices if the OMN element were included in a beacon.

In some examples, the AP 105-c may support 4 spatial stream 80 MHz and 2 spatial stream 160 MHz at the same time. In such an example, the AP 105-c can transmit an operating mode notification (OMN) element in one or more association response frames to a 3 or 4 spatial stream 160 MHz supporting wireless device, such as the wireless device 110-c. For example, the AP 105-c may advertises itself as 4 ss/160 MHz, but may avoid the use of 3-4 ss/160 MHz modulation and coding schemes (MCSs) by setting the operating bandwidth to 80 MHz at 3-4 ss/160 clients, using the OMN element. In another example, the AP 105-c may avoid the use of 3 ss and 4 ss 160 MHz MCSs by using the OMN to set a maximum allowed number of spatial streams to two for wireless devices 110 that support 3 and 4 ss 160 MHz. This could be done in combination with an indication of a maximum data rate. Otherwise, a maximum data rate can be inferred. For example, the AP 105-c may set a maximum data rate of 1560 Mbps, otherwise the inferred maximum rate of the AP 105-c may be 3.5 Gbps. In other examples, other maximum data rates may be set or inferred.

In some examples, an OMN element may be mandatory on the receiver side for a Wi-Fi 802.11ac certification. In some examples, the AP 105-c may alternatively create dual BSSs (with dual beacons). One BSS may use a 4 ss/80 MHz bandwidth mode while the other BSS may use a 2 ss/160 MHz bandwidth mode, for example. The two BSSs may use the same BSSID.

Figure 6:
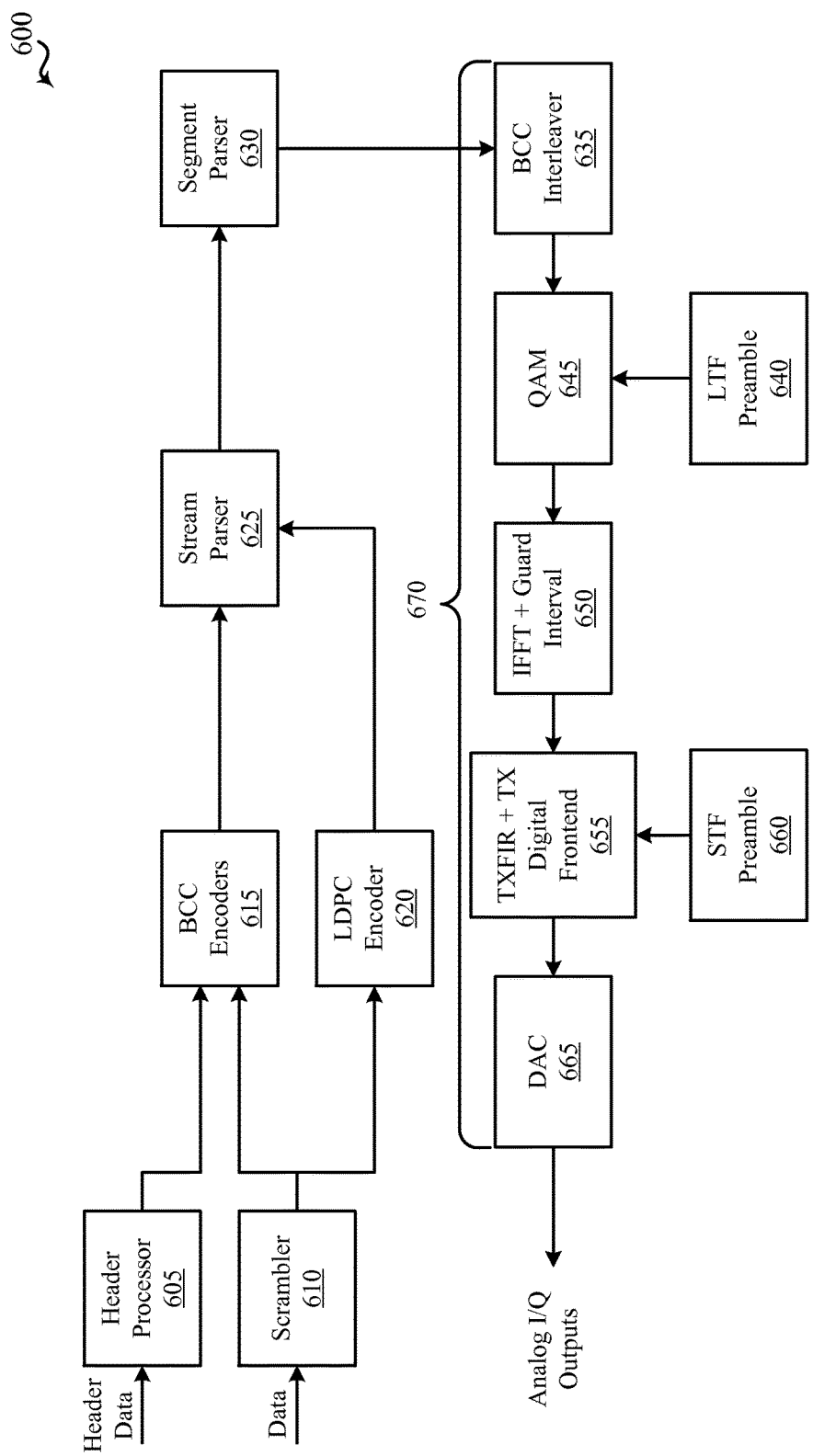
FIG. 6 shows a block diagram of an example digital portion of a physical layer of a transmitter, in accordance with various aspects of the present disclosure.

FIG. 6 shows a block diagram of an example digital portion of a physical layer of a transmitter 600, in accordance with various aspects of the present disclosure. The transmitter 600 may be included in an access point 105 or a wireless device 110, which may be an example of one or more aspects of the AP 105 or wireless device 110 described with reference to FIGS. 1 and 3-5, respectively. The components included in the transmitter 600 illustrate merely one example. In other examples, other components of the transmitter 600 may be used.

The transmitter 600 may receive, as inputs, header data into a header processor 605 and data into a scrambler 610. The header data may include control or other information for the data. The header processor 605 may interpret or otherwise process the header data and provide it to one or more BCC encoders 615. The scrambler 610 may scramble (e.g., invert or encode) the data, in the analog or digital domain. The scrambler 610 may provide the scrambled data to the one or more binary convolutional code (BCC) encoders 615 and a low-density parity check (LDPC) encoder 620.

The BCC encoder 615 and the LDPC encoder 620 may encode the scrambled data or the header data and provide the encoded data to a stream parser 625. The stream parser 625 may divide the received data into individual streams or segments. For example, the stream parser 625 may divide the received data into two streams for a 160 MHz bandwidth mode. The stream parser 625 may forward the divided data to a segment parser 630.

The segment parser 630 may divide bits of the received data between the two segments. An example functionality of the segment parser 630 is as follows. Per stream parser 625 output, the segment parser 630 takes blocks of $N_{CBPSS}$ bits (i.e., coded bits per symbol per spatial stream) and may divide them over the segments. For example, the segment parser 630 may divide the blocks over two 80 MHz segments according to equation 1.

$$y_{k,l} = x_{2sN_{ES} \lfloor \frac{k}{sN_{ES}} \rfloor + lsN_{ES} + kmod(sN_{ES})}, k = 0, 1, \ldots, \frac{N_{CBPSS}}{2} - 1 \qquad (1)$$

As shown in equation 1, $y_{k,l}$ is the output bit number k of frequency segment l. The variable s is the number of coded bits per rail in the constellation mapping and may equal ceil $$\left(\frac{N_{bpscs}}{2}\right),$$

wherein $N_{bpscs}$ may be the number of coded bits per subcarrier per stream. The variable $N_{ES}$ may be the number of binary convolution encoder. In other words, the segment parser 630 may distribute the input data in chunks of 2 $sN_{ES}$ bits over segments, which may be done in a round-robin fashion. Note that the case that $N_{CBPSS}$ is not divisible by 2 $sN_{ES}$ does not occur for one and two stream rates.

In an example of transmitting a contiguous 160 MHz channel with one synthesizer per segment, in order to deal with a third party receiver that is not capable of separate frequency offsets and timing-drift tracking per segment or channel tracking, a relative frequency error between the RF local oscillators (RFLOs) may be less than 0.005 ppm and the mismatch between the RFLOs and the sampling clock may be less than 0.005 ppm. This may be because the EVM on an outer subcarrier of a 160 MHz transmission of 4 milliseconds (ms) due to the residual timing offset is limited and may be approximately given as in equation 2.

$$20 \log_{10}(2\pi \cdot 80e^{6} \cdot 4e^{-3} - 0.005e^{-6}) = -40 \text{ dBc} \qquad (2)$$

In case of reception, if a third party transmitter does worse than above, the residual timing offset error due to a mismatch between the RFLO frequency and the sample rate may be corrected by separate frequency offset and timing-drift tracking per segment or channel tracking.

FIG. 6 shows the transmitter 600 including a single 80 MHz RF chain 670 for illustrative simplicity. However, the transmitter 600 may include more than one 80 MHz RF chain 670. For example, for each spatial stream at the 160 MHz bandwidth mode, after the segment parser 630, two 80 MHz segments may be processed by two 80 MHz RF chains 670, one for each segment, to create a single spatial stream of 160 MHz. In this manner, two spatial streams at 160 MHz may be supported with four 80 MHz RF chains 670.

The 80 MHz RF chain 670 may include a BCC interleaver 635, a long training field (LTF) preamble component 640, a QAM 645, an inverse fast Fourier Transform (IFFT) plus guard interval (GI) component 650, a transmitter finite impulse response (TXFIR) plus digital frontend component 655, a short training field preamble component 660, and a digital-to-analog converter (DAC) 665. The 80 MHz RF chain 670 outputs analog I/Q components, which may be provided to one or more antennas.

The TXFIR plus digital frontend component 655 may include a number of sub-components. For example, the TXFIR plus digital frontend component 655 may include two or more transmitter digital backend components, a beamforming or spatial expansion plus cyclic shift diversity (CSD) component, an IFFT plus GI plus low density parity check (LDPC) tone mapper component, a per transmitter CSD and phase component, a windowing component, an interpolator, a first transmitter FIR component, a first shift component, a digital clipping component, a transmitter gain component, a second FIR component, a second shift component, a digital pre-distortion (DPD) component, a local oscillator and IQ correction component, and a pre-emphasis component.

In one particular example, the interpolator component is a 10/11 interpolator 352 MHz mode component, the first FIR component is a 1×, 2×, 4× FIR component, the first shift component may shift the segments by 0, ±10, ±20, or ±30 MHz and may also duplicate the segments, the second FIR component is a 2×, 4×, 8× FIR component, and the second shift component may shift the segments 0, ±10, ±20, ±30, ±40, or ±45 MHz.

The TXFIR plus digital frontend component 655 may include some changes over typical component configurations in order to handle the 160 MHz bandwidth mode. In one example, these changes are used for the option that includes the ADCs at double the speed (e.g., 320 Msps). For example, the TXFIR may include additional coefficients for the 160 MHz channel. In some examples, the TXFIR of each segment should be sharp enough to keep any spillover to the other segment below an acceptable level, in order to not cause too much co-channel interference (CCI). At least one of the shift components (e.g., digital shifters) may be able to shift the segments by a greater number of MHz (e.g., 40 and 45). This additional digital frequency shift may be needed to support the 165 MHz bandwidth mode. The local oscillator and I/Q correction component may also include more taps for I/Q correction for a more accurate correction over a wider range (e.g., −85 to 85 MHz). A single user beamforming (SUBF) for 160 MHz may function as the beamformer for two TX per segment and up to 2 spatial streams.

In an example where the transmitting device (e.g., an AP 105 or wireless device 110) has four RF chains and four antennas, the two 80 MHz segments may be added in the air. In an example with four RF chains and two antennas, the two 80 MHz segments may be added after the RF chains.

In another example, if a wireless device 110 is permitted to begin a transmit opportunity (TXOP) and the wireless device 110 has at least one media access control (MAC) service data unit (MSDU) pending for transmission for the access category of the permitted TXOP, the wireless device 110 may perform only one of the following steps. In a first option, the wireless device 110 may transmit a 160 MHz or 80+80 MHz mask physical layer convergence protocol (PLCP) protocol data unit (PPDU) if the secondary channel, the secondary 40 MHz channel, and the secondary 80 MHz channel were idle during an interval of point coordination function (PCF) interframe space (PIFS) immediately preceding the start of the TXOP. Alternatively, the wireless device 110 may transmit an 80 MHz mask PPDU on the primary 80 MHz channel if both the secondary channel and the secondary 40 MHz channel were idle during an interval of PIFS immediately preceding the start of the TXOP. In another alternative, the wireless device 110 may transmit a 40 MHz mask PPDU on the primary 40 MHz channel if the secondary channel was idle during an interval of PIFS immediately preceding the start of the TXOP. In yet another alternative, the wireless device 110 may transmit 20 MHz mask PPDU on the primary 20 MHz channel. Finally, the wireless device 110 may restart the channel access attempt by invoking a backoff procedure.

Figure 7:
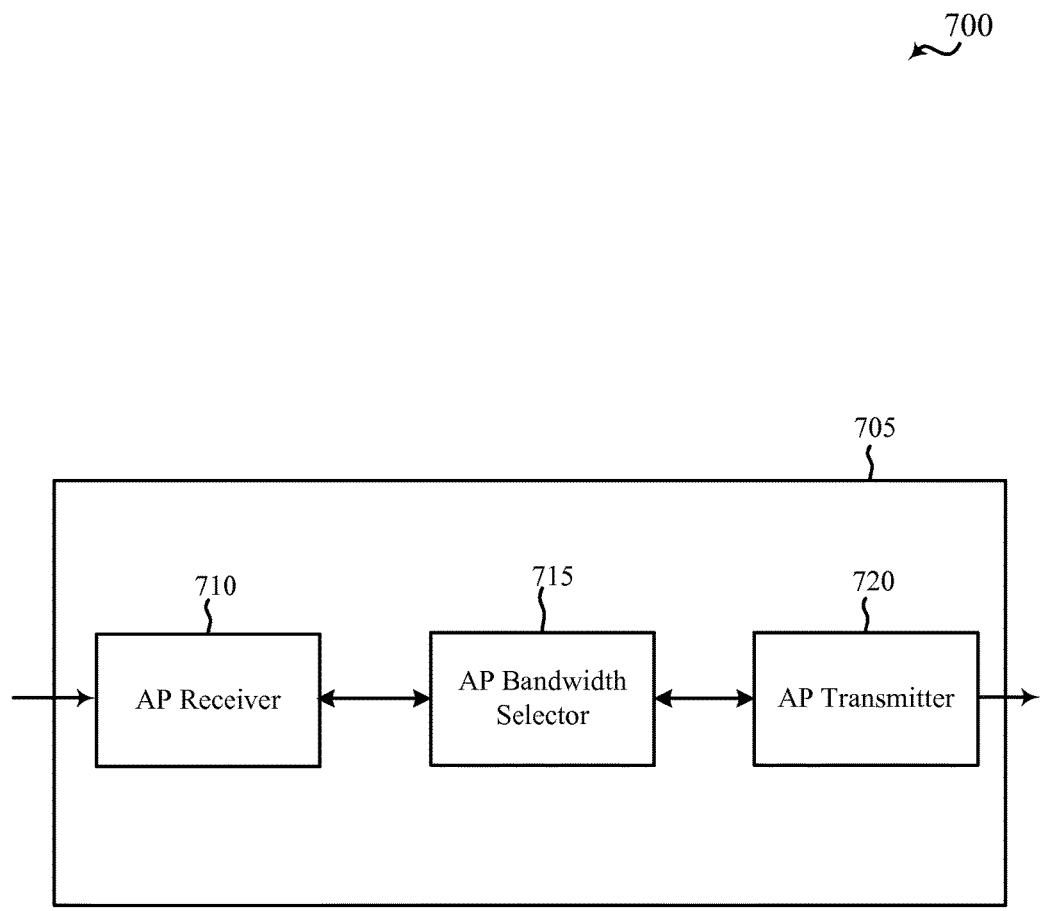
FIG. 7 shows a block diagram of a device configured for use in wireless communication, in accordance with various aspects of the present disclosure.

FIG. 7 shows a block diagram 700 of a wireless device 705 for use in an AP for wireless communication, in accordance with various aspects of the present disclosure. The wireless device 705 may be an example of one or more aspects of a APs 105 described with reference to FIGS. 1 and 3-5. The wireless device 705 may include a receiver 710, an AP bandwidth selector 715, and/or a transmitter 720. The wireless device 705 may also be or include a processor. Each of these components may be in communication with each other.

The wireless device 705, through the receiver 710, the AP bandwidth selector 715, or the transmitter 720, may be configured to perform functions described herein. For example, the wireless device 705 may be configured to operate in one or more bandwidth modes, including a 20, 40, 80, 80+80, 160 contiguous, and 165 MHz bandwidth modes.

The components of the wireless device 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The receiver 710 may receive information such as packets, user data, and/or control information associated with various information channels (e.g., control channels, data channels, etc.). The receiver 710 may be configured to receive one or more data packets at 160 MHz or 165 MHz, for example. Information may be passed on to the AP bandwidth selector 715, and to other components of the wireless device 705.

In some examples, the AP receiver 710 may include some features in order to support the 160 MHz bandwidth mode. In some examples, the sampling rate of an ADC of the AP receiver 710 may be increased (e.g., doubled) to 320 Msps and it has a bitwidth of 10 bits. An extrapolated initial frequency offset estimate on a primary 20 MHz channel may be applied to a secondary 80 MHz channel starting from a first VHT-LTF symbol. The AP receiver 710 may also be capable of independent phase, frequency, and timing-drift tracking per segment. A channel estimation may perform two different two spatial stream channel estimates. The AP receiver 710 may also include two 2×2 QR decomposition (QRD) components and a MIMO decoder. In some examples, the AP receiver 710 includes two MIMO decoders, one per segment. The AP receiver 710 may also perform segment deparsing (e.g., the inverse of segment parsing at the transmitter) before stream deparsing. The AP receiver 160 may also support radar detection for 160 MHz.

The AP receiver 710 may also include an automatic front end (AFE) component in order to perform automatic gain control (AGC). The automatic gain control may be performed per chain or per segment. Further, a receiver finite impulse response (FIR) filter (RXFIR) for one segment may be sharp enough to suppress the adjacent channel interference (ACI) of another segment, where the Fast Fourier Transform (FFT) is oversampled by a factor of two.

Detection for the AGC may be done with all four receive antennas on the primary segment. Some delay may be introduced by adding an additional RXFIR. Power estimates for the ADC may be performed at 320 MHz.

After the AP receiver 710 detects an 160 MHz packet, the wireless device 705 switches to the 2×2 mode during very high throughput short training field (VHT-STF) by changing frequency shift on input of 2 chains from −40 to +40 MHz if the primary 20 MHz channel is in a lower segment or from +40 to −40 MHz if the primary 20 MHz channel is in an upper segment. For example, these are the cases where a carrier frequency is −40 MHz from the center of the upper segment or +40 MHz from the center of the lower segment, respectively. Alternatively, the frequency shifts may be static, but the proper first FIR output is selected. For example, for the 160 MHz bandwidth mode, two digital backend chains may select a first FIR FFT/TDC ext80 MHz output, while the other backend chains stay with the primary 80 MHz output. The frequency shifts may also be +45 MHz, −45 MHz, +42.5 MHz, or −42.5 MHz The wireless device 705 may also support different listen and detection modes. That is, the wireless device 705 may monitor or listen for traffic using bandwidth modes. Dynamic switching may be used to during VHF-STF to switch between a given listen mode and a detection mode.

In some examples capable of supporting the 165 MHz bandwidth mode, the AP receiver 710 may use an 80+80 MHz spectral mask. for example, if the transmitter local oscillator is at 5732.5 MHz, each 80 MHz spectrum may have a level of about 20.3 dBr, which combined may allow a level of about −17.3 dBr for the transmit local oscillator (TXLO). In some examples, the TXLO may be at anywhere between 5730 through 5735 MHz, which may require a level of −10 dBr. In other examples, other frequencies for the TXLO may be used.

For channel estimation and compressed beamforming feedback, the AP receiver 710 may include a channel estimation block that supports two spatial stream 80 MHz channel estimates (i.e., one per segment). For VHT160, a VHT compressed beamforming feedback matrix subfield of a VHT compressed beamforming feedback report field may consist of the (grouped) tones of the lower and upper segment (which may be ordered from most left tone in frequency domain to most right tone). In one example, the AP receiver includes two 2×2 80 MHz singular value decomposition (SVD) components. For MU feedback, a delta SNR in a VHT MU exclusive beamforming report field is computed with respect to the average SNR (or average channel power) over all tones (i.e., not per segment).

In some examples, the AP receiver 710 may not support implicit beamforming in an 80+80 MHz bandwidth mode, but may support implicit beamforming for STAs that operate according to bandwidth modes of 80 MHz or less. If in the 80+80 MHz bandwidth mode the default listen mode uses three receive chains on a primary 80 MHz channel and three receive chains on a secondary 80 MHz channel, implicit beamforming channel estimates on L-LTFs from the STA may not be received over the optimal four receive chains.

To address this issue, the MAC layer of the AP receiver 710 may determine when an acknowledgement (ACK) message with a bandwidth of 80 MHz or less is expected from the STA. When such an ACK message is expected, the MAC layer of the AP receiver 710 may signal to the PHY layer to adjust the number of receive chains used for the primary 80 MHz channel (e.g., from three receive chains to four receive chains) to allow for implicit beamforming channel estimates to be performed on the desired number of receive chains. This signaling may be via a management message from the MAC layer to the PHY layer. The management message may indicate the number of receive chains to allocate to the listening mode of the primary 80 MHz channel (e.g., four receive chains). Alternatively, the management message may indicate a number of frequency segments for the listen mode, with an explicit or implicit message that a certain number of receive chains (e.g., four) is to be tuned to the first frequency segment and the remainder of the receive chains (e.g., two) is to be tuned to the second frequency segment.

The AP receiver 710 may also perform frequency offset estimation and pilot tracking A 160 MHz device, for example, may use a separate phase-locked-loop (PLL) per segment, which may cause phase noise variations between the segments that must be tracked separately. If a third part transmitter sends 160 MHz as 80+80 MHz with two RFLOs, there may be a risk of inaccuracy between the segment dividers in generating the two RFLOs. In such a case, the AP receiver 710 may perform separate frequency and timing tracking per segment in addition to separate phase tracking per segment.

In some examples, the inaccuracy between the segment dividers may not be bad to warrant a separate initial frequency offset estimate on the secondary 80 MHz channel, so the AP receiver 710 may extrapolate the initial frequency offset estimate on the primary 20 MHz channel to apply it on the secondary 80 MHz channel starting from a first VHT Long Training Field (VHT-LTF) symbol. An example frequency offset is provided in equation 3, where $f_{center,s80}$ and $f_{center,p20}$ are the center RF frequency of the secondary 80 MHz channel and the primary 20 MHz channel, respectively.

$$f_{off,s80} = f_{off,p20} \frac{f_{center,s80}}{f_{center,p20}} \qquad (3)$$

In some examples, pilot tracking per segment may be the same as a typical 80 MHz pilot tracking with the understanding that the carrier frequency per segment is in the middle of the corresponding segment. In some examples, separate timing drift per segment is possible.

The AP receiver 710 may also include two 2×2 QRD components and MIMO decoders, one per segment. In some examples, the AP receiver 710 may alternatively map the two spatial stream 160 MHz channel onto a four spatial stream 80 MHz MIMO decoder. That is, the two spatial streams may be combined onto the two 80 MHz segments to four spatial streams using a block diagonal channel matrix with the two 2×2 segment channel matrices on the diagonal.

The following describes a way to use a 4×4 MIMO decoder for two 2×2 MIMO decodings. If $y_{i,p80}(k)$ represents the RX signal on the subcarrier of the primary 80 MHz segment and $y_{i,s80}(k)$ that of the secondary 80 MHz segment, $x_{i,p80}(k)$ and $x_{i,s80}(k)$ the respective TX signals, and $H_{p80}(k)$ and $H_{s,80}(k)$ the 2×2 MIMO channels, then this may be combined (omitting subcarrier index k) in a 4×4 equation as shown in equation 4.

$$\begin{pmatrix} y_{1,p80} \\ y_{2,p80} \\ y_{1,s80} \\ y_{2,s80} \end{pmatrix} = \begin{pmatrix} h_{11,p80} & h_{12,p80} & 0 & 0 \\ h_{21,p80} & h_{22,p80} & 0 & 0 \\ 0 & 0 & h_{11,s80} & h_{12,s80} \\ 0 & 0 & h_{21,s80} & h_{22,s80} \end{pmatrix} \begin{pmatrix} x_{1,p80} \\ x_{2,p80} \\ x_{1,s80} \\ x_{2,s80} \end{pmatrix} \quad (4)$$

Doing the QR decomposition on above block diagonal 4×4 channel matrix results in equation 5.

$$QR = qr\left(\begin{pmatrix} h_{11,p80} & h_{12,p80} & 0 & 0 \\ h_{21,p80} & h_{22,p80} & 0 & 0 \\ 0 & 0 & h_{11,s80} & h_{12,s80} \\ 0 & 0 & h_{21,s80} & h_{22,s80} \end{pmatrix}\right) = \quad (5)$$

$$\begin{pmatrix} q_{11,p80} & q_{12,p80} & 0 & 0 \\ q_{21,p80} & q_{22,p80} & 0 & 0 \\ 0 & 0 & q_{11,s80} & q_{12,s80} \\ 0 & 0 & q_{21,s80} & q_{22,s80} \end{pmatrix}$$

$$\begin{pmatrix} r_{11,p80} & r_{12,p80} & 0 & 0 \\ 0 & r_{22,p80} & 0 & 0 \\ 0 & 0 & r_{11,s80} & r_{12,s80} \\ 0 & 0 & 0 & r_{22,s80} \end{pmatrix}$$

From equation 5, the QR decomposition may not change the property that the two 2×2 MIMO equations are independent. This may allow for independent frequency and phase tracking per 80 MHz segment. In some situations, parts of the 4×4 MIMO processing that are not being used may be disabled to save power.

The AP receiver 710 may perform radar detection over the selected bandwidth. In one example, the AP receiver 710 may perform radar detection separately on the primary and secondary segments. Alternatively, the AP receiver 710 may increase radar FFTs by 2 as well as the clock speed of the other processing elements. For example, a short FFT may be doubled from 128 to 256 points and a regular FFT may be doubled from 512 to 1024 points. These FFTs may be reused for round trip time (RTT) and spectral scanning. In some examples, only one segment needs to do radar detection for the lowest 160 MHz channel and the 160 MHz bandwidth mode. In some examples, the radar detection hardware may be run at the ADC rate while the software performs any filtering.

If fine timing measurements (FTMs) are sent in VHT160 format, the AP receiver 710 may perform 80+80 MHz RTT processing using the channel estimates on the VHT-LTFs. For legacy octuplicate (i.e., duplicate 160) frames, the AP receiver 710 may use the primary 80 MHz channel only (because no L-LTF channel estimation is done on the secondary 80 MHz channel). In some examples, 160 MHz RTT processing may not be possible because the VHT channel estimates of each segment come from different receive antennas. The 160 MHz RTT or the 80+80 RTT may require the AP receiver 710 to include extra 80 MHz chains (e.g., at least up to and including the channel estimation) to make sure that on at least two receive antennas is obtained to get an 80 MHz channel estimate (e.g., one receive antenna on the primary 80 MHz channel and one receive antenna on the secondary 80 MHz channel).

In some examples, the wireless device 705 may correct for potential phase discontinuities in legacy duplicate 40/80/160 packets between 20 MHz sub-channels at the transmitter 720 and between the primary 80 MHz channel and the secondary 80 MHz channel at both the transmitter 720 and the receiver 710. A management message indicates the listening mode to a physical (PHY) layer. In some examples, the management message may be a media access control (MAC) message. The receiver may be reconfigured based on an expected data packet type that may be conveyed in the management message. For example, the configuration of the receiver 710 may be adjusted in order that the receiver 710 may be capable of receiving an expected data packet type based on the management message.

The AP bandwidth selector 715 may switch the wireless device 705 between operating in one or more bandwidth modes, including a 20, 40, 80, 80+80, 160 contiguous, and 165 MHz bandwidth modes. The AP bandwidth selector 715 may cause the wireless device 705 to advertise support by a wireless device for the different bandwidth modes. The AP bandwidth selector 715 may also adjust the number of MIMO spatial streams currently used by the wireless device 705 in response to the selected bandwidth mode.

The AP transmitter 720 may be one or more aspects of the transmitter 600 of FIG. 6. The AP transmitter 720 may transmit the one or more signals received from other components of the wireless device 705, for example, a bandwidth support message 305 or a bandwidth identification message 310. The AP transmitter 720 may include components that enable channel bonding between a plurality of channels. The AP transmitter 720 may transmit one or more data packets at 160 MHz or 165 MHz, for example. In some examples, the AP transmitter 720 may be collocated with the receiver 710 in a transceiver.

Figure 8:
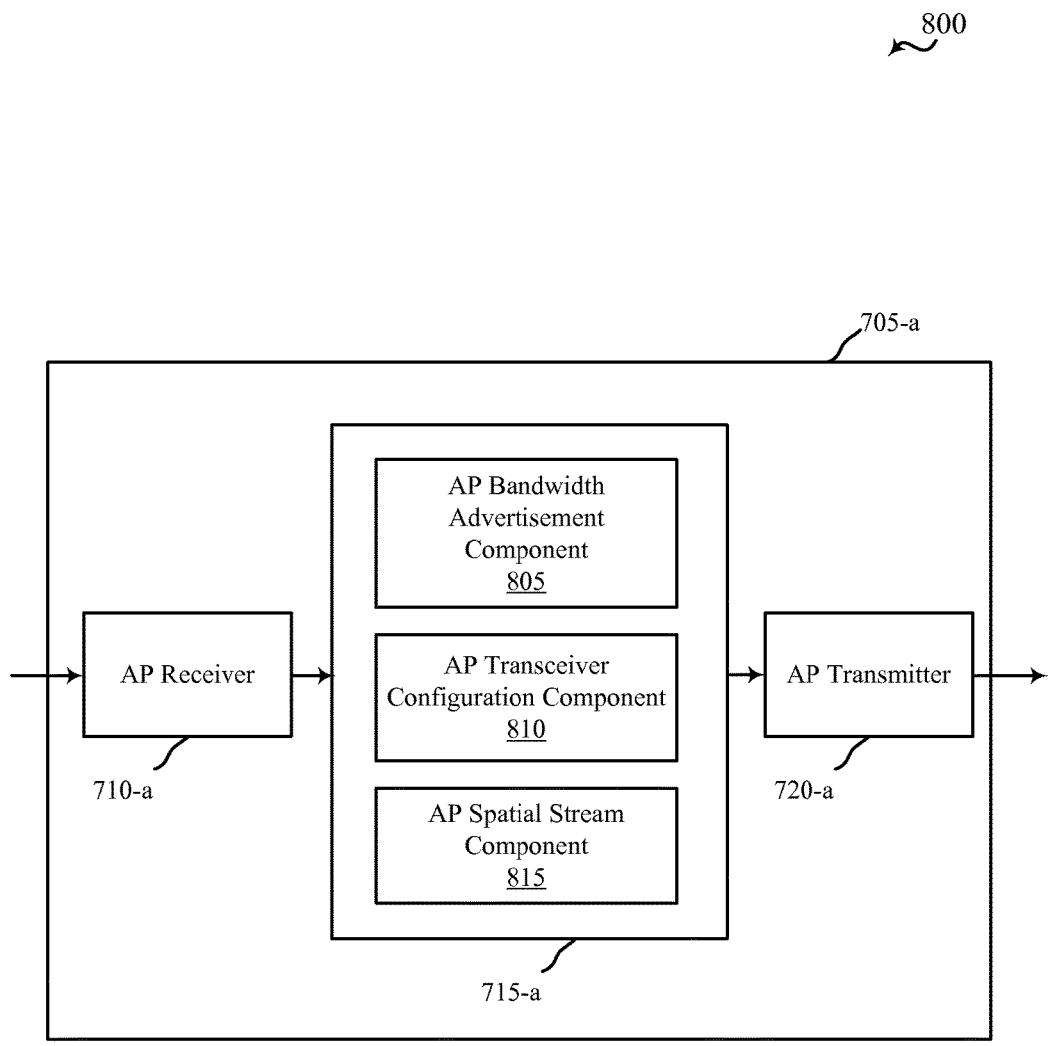
FIG. 8 shows a block diagram of a device configured for use in wireless communication, in accordance with various aspects of the present disclosure.

FIG. 8 shows a block diagram 800 of a wireless device 705-a that is used in an AP for wireless communication, in accordance with various examples. The wireless device 705-a may be an example of one or more aspects of the APs 105 described with reference to FIGS. 1 and 3-5. It may also be an example of a wireless device 705 described with reference to FIG. 7. The wireless device 705-a may include an AP receiver 710-a, AP bandwidth selector 715-a, or an AP transmitter 720-a, which may be examples of the corresponding modules of the wireless device 705. The wireless device 705-a may also include a processor. Each of these modules may be in communication with each other. The AP bandwidth selector 715-a may include an AP bandwidth advertisement component 805, an AP transceiver configuration component 810, and an AP spatial stream component 815. The AP receiver 710-a and the AP transmitter 720-a may perform the functions of the AP receiver 710 and the AP transmitter 720, of FIG. 7, respectively.

The components of the wireless device 705-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The AP bandwidth advertisement component 805 causes the wireless device 705-a to send bandwidth support messages to one or more client wireless devices 110 and other APs 105. The AP bandwidth advertisement component 805 may also interpret a bandwidth support message received at the AP receiver 710-a. Based on an identified bandwidth in the bandwidth support message, the AP bandwidth selector 715-a may select a current bandwidth mode to match the identified bandwidth.

The AP transceiver configuration component 810 may update the AP receiver 710-a or the transmitter 720-a based on the selected bandwidth mode. The AP spatial stream component 815 may adjust the MIMO spatial streams used based on the selected bandwidth mode.

Figure 9A:
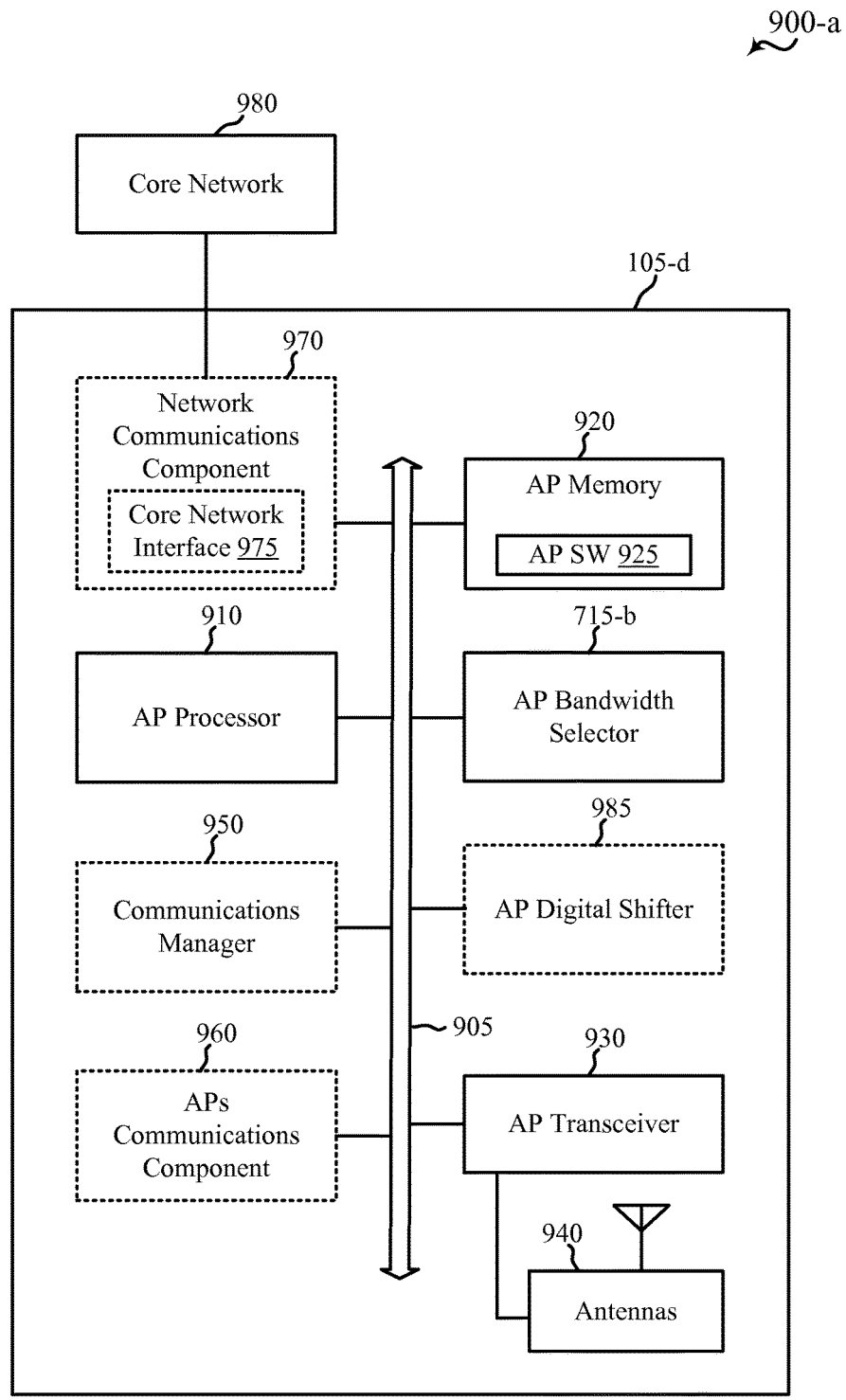
FIGS. 9A and 9B show block diagrams of a wireless communication system, in accordance with various aspects of the present disclosure.

Turning to FIG. 9A, a diagram 900-a is shown that illustrates an access point or AP 105-d configured for operating in one or more bandwidth modes, including an 80+80, 160 contiguous, and 165 MHz bandwidth modes. In some aspects, the AP 105-d may be an example of the APs 105 of FIGS. 1 and 3-5. The AP 105-d may include an AP processor 910, an AP memory 920, an AP transceiver 930, antennas 940, and an AP bandwidth selector 715-b. The AP bandwidth selector 715-b may be an example of the AP bandwidth selector 715 of FIGS. 7 and 8. In some examples, the AP 105-d may also include one or both of an APs communications manager 950, an AP communications component 960, and an AP network communications component 970. The AP network communications component 970 may further include an AP core network interface 975. Each of these components may be in communication with each other, directly or indirectly, over at least one bus 905.

The AP memory 920 may include random access memory (RAM) and read-only memory (ROM). The AP memory 920 may also store computer-readable, computer-executable software (SW) code 925 containing instructions that are configured to, when executed, cause the AP processor 910 to perform various functions described herein for using different bandwidth modes such as the 80+80, 160, and 165 MHz bandwidth modes, for example. Alternatively, the software code 925 may not be directly executable by the AP processor 910 but be configured to cause the computer, e.g., when compiled and executed, to perform functions described herein.

The AP processor 910 may include an intelligent hardware device, e.g., a central processing unit (CPU), a microcontroller, an ASIC, and the like. The AP processor 910 may process information received through the AP transceiver 930, the APs communications component 960, and/or the AP network communications component 970. The AP processor 910 may also process information to be sent to the AP transceiver 930 for transmission through the antennas 940, to the APs communications component 960, and/or to the AP network communications component 970. The AP processor 910 may handle, alone or in connection with the AP bandwidth selector 715-b various aspects related to channel bonding to support 80+80, 160, and 165 MHz bandwidth modes.

The AP transceiver 930 may include a modem configured to modulate the packets and provide the modulated packets to the antennas 940 for transmission, and to demodulate packets received from the antennas 940. The AP transceiver 930 may be implemented as at least one transmitter module and at least one separate receiver module. The AP transceiver 930 may be configured to communicate bi-directionally, via the antennas 940, with at least one wireless device 110 as illustrated in FIGS. 1, 3, and 4, for example. The AP 105-d may typically include multiple antennas 940 (e.g., an antenna array). The AP 105-d may communicate with an AP core network 980 through the AP network communications component 970. The AP 105-d may communicate with other APs as well, using an APs communications component 960.

According to the architecture of FIG. 9A, the AP 105-d may further include a AP communications manager 950. The AP communications manager 950 may manage communications with stations and/or other devices as illustrated in the WLAN network 100 of FIG. 1. The AP communications manager 950 may be in communication with some or all of the other components of the AP 105-d via the bus or buses 905. Alternatively, functionality of the AP communications manager 950 may be implemented as a component of the AP transceiver 930, as a computer program product, and/or as at least one controller element of the AP processor 910.

The AP 105-d may further include a digital shifter 785. The digital shifter 785 may shift frequencies of one or more channels or chains, such as by ±40 or 45 MHz. In some examples, the digital shifter 785 is part of the AP transceiver 930.

The components of the AP 105-d may be configured to implement aspects discussed above with respect to FIGS. 1-8, and those aspects may not be repeated here for the sake of brevity. Moreover, the components of the AP 105-d may be configured to implement aspects discussed below with respect to FIGS. 13 and 14 and those aspects may not be repeated here also for the sake of brevity.

Figure 9B:
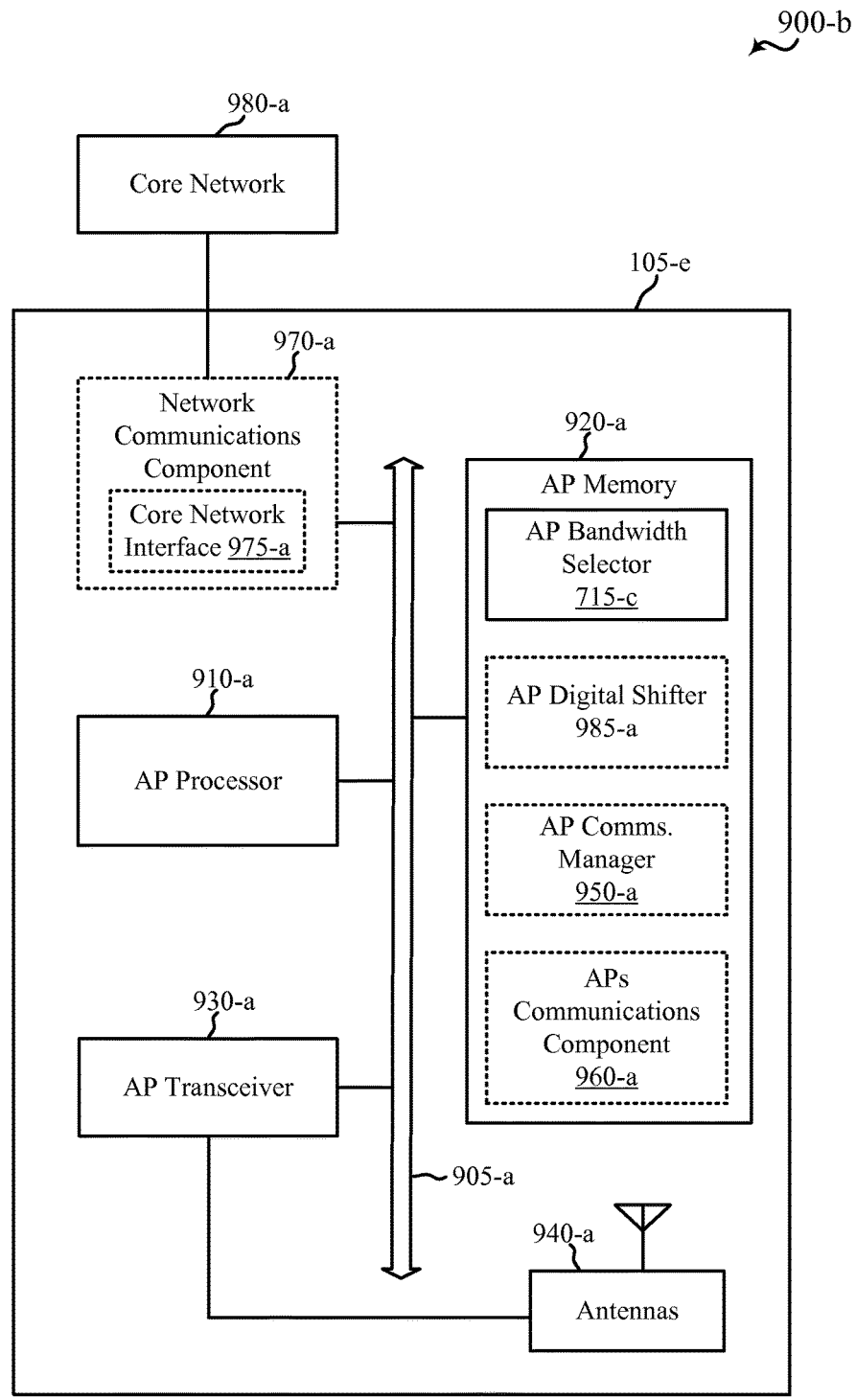

Turning to FIG. 9B, a diagram 900b is shown that illustrates an access point or AP 105-e configured for operating in one or more bandwidth modes, including an 80+80, 160 contiguous, and 165 MHz bandwidth modes. In some aspects, the AP 105-e may be an example of the APs 105 of FIGS. 1, 3-5, and 9A. Similar to the AP 105-d of FIG. 9A, the AP 105-e may include an AP processor 910-a, an AP memory 920-a, an AP transceiver 930-a, antennas 940-a, and an AP bandwidth selector 715-c, which may perform the functions of the corresponding components in FIG. 9A. The AP bandwidth selector 715-c may be an example of the AP bandwidth selector 715 of FIGS. 7-9A. In some examples, the AP 105-e may also include one or both of an AP communications manager 950-a, an AP communications component 960-a, and an AP network communications component 970-a, which may perform the functions of the corresponding components in FIG. 9A. The AP network communications component 970-a may further include an AP core network interface 975-a. Each of these components may be in communication with each other, directly or indirectly, over at least one bus 905-a.

The example of FIG. 9B illustrates the AP bandwidth selector 715-a, an AP digital shifter 938-a, the AP communications manager 950-a, and the AP communications component 960-a as software stored in the AP memory 920-a. The AP memory 920-a may store these components as computer-readable, computer-executable software code containing instructions that are configured to, when executed, cause the AP processor 910-a to perform various functions described herein for using different bandwidth modes such as the 80+80, 160, and 165 MHz bandwidth modes, for example. Alternatively, the AP bandwidth selector 715-a, the AP digital shifter 938-a, the AP communications manager 950-a, and the AP communications component 960-a may not be directly executable by the AP processor 910-a but be configured to cause the computer, e.g., when compiled and executed, to perform functions described herein.

The components of the AP 105-*e* may be configured to implement aspects discussed above with respect to FIGS. 1-8 and 9A, and those aspects may not be repeated here for the sake of brevity. Moreover, the components of the AP 105-*e* may be configured to implement aspects discussed below with respect to FIGS. 13 and 14 and those aspects may not be repeated here also for the sake of brevity.

Figure 10:
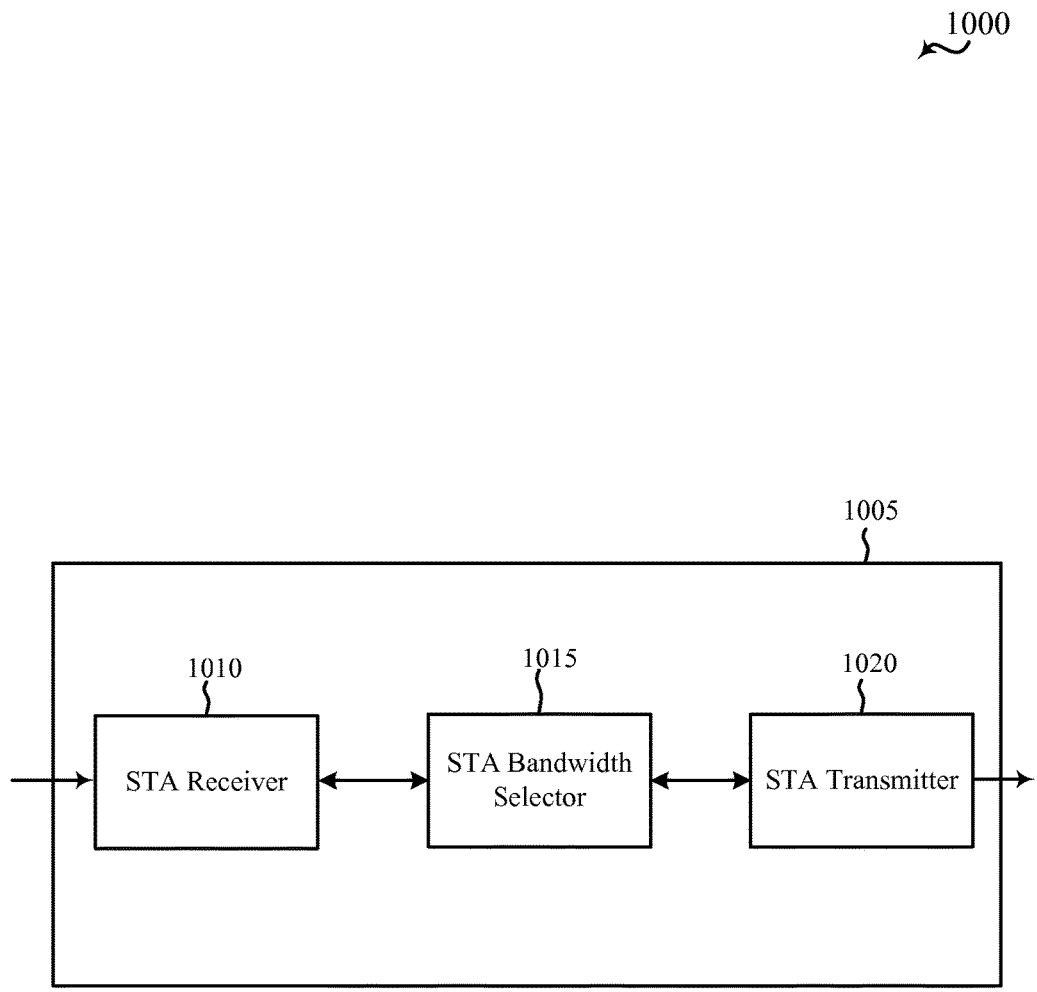
FIG. 10 shows a block diagram of an apparatus for use in wireless communication, in accordance with various aspects of the present disclosure.

FIG. 10 shows a block diagram 1000 of a wireless device 1005 for use in a station for wireless communication, in accordance with various aspects of the present disclosure. In some examples, the wireless device 1005 may be an example of aspects of one or more of the wireless devices 110 described with reference to FIGS. 1 and 3-5. The wireless device 1005 may also be or include a processor. The wireless device 1005 may include a STA receiver 1010, a STA bandwidth selector 1015, or a STA transmitter 1020. Each of these modules may be in communication with each other.

The wireless device 1005, through the STA receiver 1010, the STA bandwidth selector 1015, or the STA transmitter 1020, may be configured to perform functions described herein. For example, the wireless device 1005 may be configured to perform various aspects related to channel bonding to support 80+80, 160, and 165 MHz bandwidth modes.

The components of the wireless device 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

The STA receiver 1010 may receive information such as packets, user data, or control information associated with various information channels (e.g., control channels, data channels, etc.). The STA receiver 1010 may be configured to receive data packets over various frequencies, bandwidth support messages, and bandwidth identification messages. Information may be passed on to the STA bandwidth selector 1015, and to other components of the wireless device 1005.

The STA bandwidth selector 1015 may be configured to implement aspects discussed above with respect to the AP bandwidth selector 715 of FIGS. 7-9, and those aspects may not be repeated here for the sake of brevity.

The STA transmitter 1020 may transmit the one or more signals received from other components of the wireless device 1005. The STA transmitter 1020 may transmit data packets over various frequencies, bandwidth support messages, and bandwidth identification messages. In some examples, the STA transmitter 1020 may be collocated with the STA receiver 1010 in a transceiver. The STA transmitter 1020 may include a single antenna, or it may include a plurality of antennas.

Figure 11:
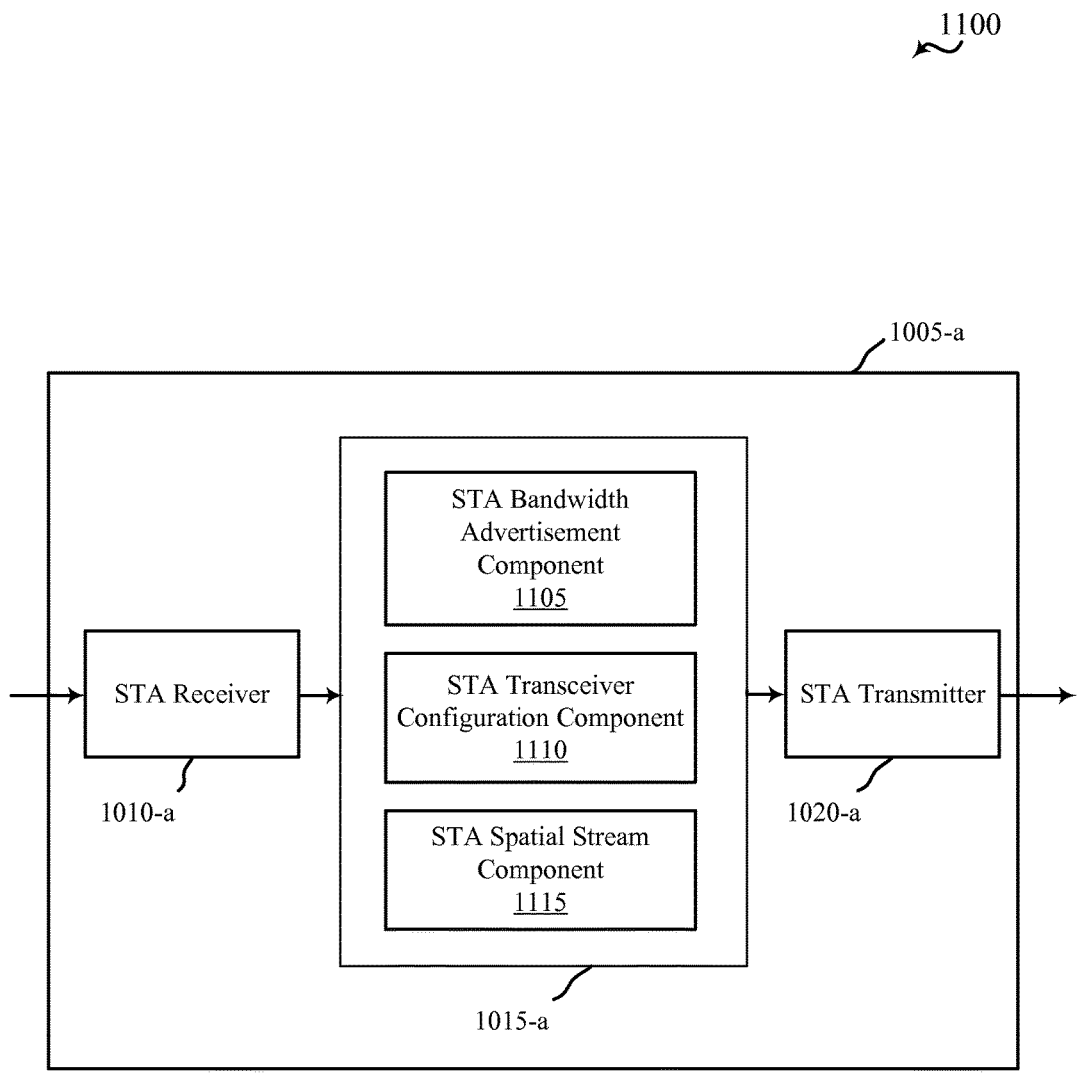
FIG. 11 shows a block diagram of an apparatus for use in wireless communication, in accordance with various aspects of the present disclosure.

FIG. 11 shows a block diagram 1100 of a wireless device 1005-*a* that is used in a wireless device for wireless communication, in accordance with various examples. The wireless device 1005-*a* may be an example of one or more aspects of a wireless device 110 described with reference to FIGS. 1 and 3-5. It may also be an example of a wireless device 1005 described with reference to FIG. 10. The wireless device 1005-*a* may include a STA receiver 1010-*a*, a STA bandwidth selector 1015-*a*, or a STA transmitter 1020-*a*, which may be examples of the corresponding modules of wireless device 1005. The wireless device 1005-*a* may also include a processor. Each of these components may be in communication with each other. The STA bandwidth selector 1015-*a* may include a STA bandwidth advertisement component 1105, a STA transceiver configuration component 1110, and a STA spatial stream component 1115. The STA receiver 1010-*a* and the STA transmitter 1020-*a* may perform the functions of the STA receiver 1010 and the STA transmitter 1020, of FIG. 10, respectively.

The STA bandwidth advertisement component 1105, the STA transceiver configuration component 1110, and the STA spatial stream component 1115 may be configured to implement aspects discussed above with respect to the AP bandwidth advertisement component 805, the AP transceiver configuration component 810, and the AP spatial stream component 815 of FIG. 8, and those aspects may not be repeated here for the sake of brevity.

Figure 12A:
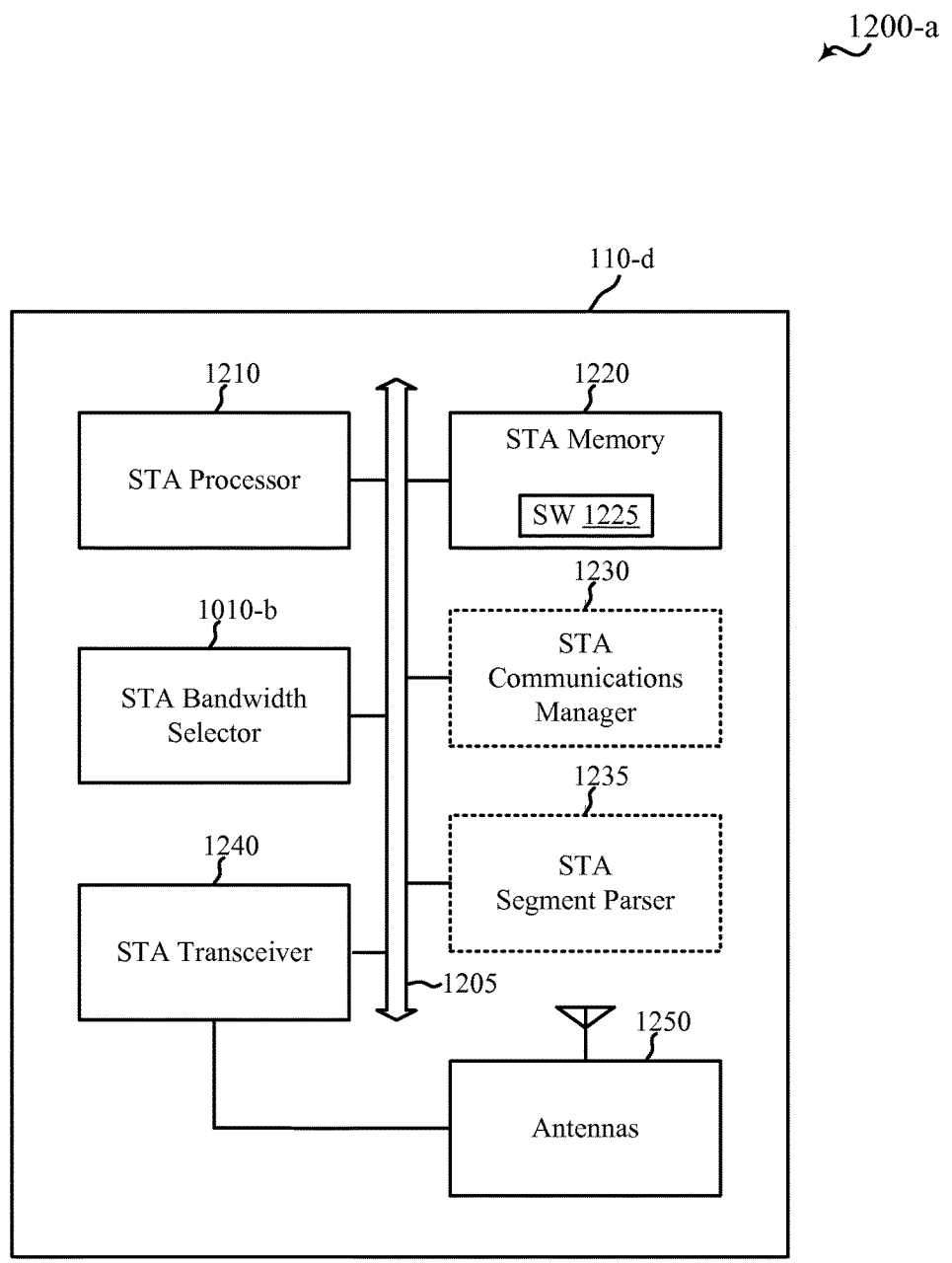
FIGS. 12A and 12B show block diagrams of a wireless device for use in wireless communication, in accordance with various aspects of the present disclosure.

Turning to FIG. 12A, a diagram 1200-*a* is shown that illustrates a wireless device 110-*d* configured for operating in multiple bandwidth modes, including a 20, 40, 80, 80+80, 160, and 165 MHz bandwidth modes. The wireless device 110-*d* may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, and the like. The wireless device 110-*d* may have an internal power supply, such as a small battery, to facilitate mobile operation. The wireless device 110-*d* may be an example of the wireless devices 110 of FIGS. 1 and 3-5.

The wireless device 110-*d* may include a STA processor 1210, a STA memory 1220, a STA transceiver 1240, antennas 1250, and a STA bandwidth selector 1015-*b*. The STA bandwidth selector 1015-*b* may be an example of the STA bandwidth selector 1015 of FIGS. 10 and 11. Each of these components may be in communication with each other, directly or indirectly, over at least one bus 1205.

The STA memory 1220 may include RAM and ROM. The STA memory 1220 may store computer-readable, computer-executable software (SW) code 1225 containing instructions that are configured to, when executed, cause the STA processor 1210 to perform various functions described herein for channel bonding. Alternatively, the software code 1225 may not be directly executable by the STA processor 1210 but be configured to cause the computer (e.g., when compiled and executed) to perform functions described herein.

The STA processor 1210 may include an intelligent hardware device, e.g., a CPU, a microcontroller, an ASIC, and the like. The STA processor 1210 may process information received through the STA transceiver 1240 or to be sent to the STA transceiver 1240 for transmission through the antennas 1250. The STA processor 1210 may handle, alone or in connection with the STA bandwidth selector 1015-*b*, various related to channel bonding to support 80+80, 160, and 165 MHz bandwidth modes.

The STA transceiver 1240 may be configured to communicate bi-directionally with APs 105 in FIGS. 1, 3-5, and 9. The STA transceiver 1240 may be implemented as at least one transmitter and at least one separate receiver. The STA transceiver 1240 may include a modem configured to modulate the packets and provide the modulated packets to the antennas 1250 for transmission, and to demodulate packets received from the antennas 1250. While the wireless device 110-*d* may include multiple antennas, there may be aspects in which the wireless device 110-*d* may include a single antenna 1250.

According to the architecture of FIG. 12, the wireless device 110-*d* may further include a STA communications manager 1230. The STA communications manager 1230 may manage communications with various access points. The STA communications manager 1230 may be a component of the wireless device 110-*d* in communication with some or all of the other components of the wireless device 110-*d* over the at least one bus 1205. Alternatively, functionality of the STA communications manager 1230 may be implemented as a component of the STA transceiver 1240, as a computer program product, or as at least one controller element of the STA processor 1210.

The wireless device 110-*d* may further include a STA segment parser 1235. The STA segment parser 1235 may parse bandwidth segments in order to perform channel bonding, such as in the 80+80 bandwidth mode. In some examples, the STA segment parser 1235 is part of the STA transceiver 1240.

The components of the wireless device 110-*d* may be configured to implement aspects discussed above with respect to FIGS. 1-6, 10, and 11, and those aspects may not be repeated here for the sake of brevity. Moreover, the components of the wireless device 110-*d* may be configured to implement aspects discussed below with respect to FIGS. 13 and 14, and those aspects may not be repeated here also for the sake of brevity.

Figure 12B:
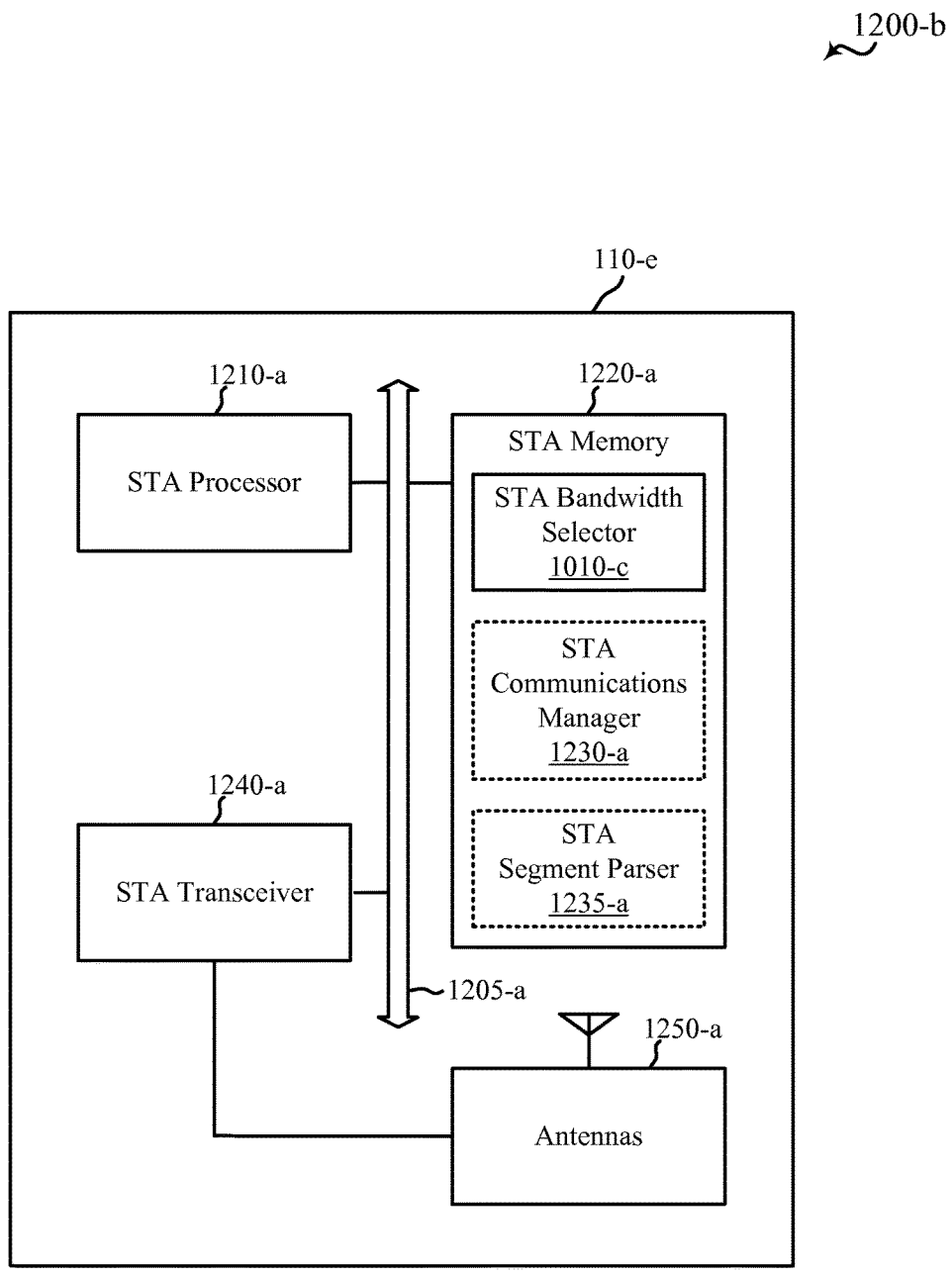

FIG. 12B shows a diagram 1200-*b* that illustrates a wireless device 110-*e* configured for operating in multiple bandwidth modes, including a 20, 40, 80, 80+80, 160, and 165 MHz bandwidth modes. The wireless device 110-*e* may be an example of the wireless devices 110 of FIGS. 1, 3-5, and 12A.

The wireless device 110-*e* may include a STA processor 1210-*a*, a STA memory 1220-*a*, a STA transceiver 1240-*a* antennas 1250-*a*, and a STA bandwidth selector 1015-*c*. The STA bandwidth selector 1015-*c* may be an example of the STA bandwidth selector 1015 of FIGS. 10, 11, and 12A. Each of these components may be in communication with each other, directly or indirectly, over at least one bus 1205-*a*. The components of the wireless device 110-*e* may perform the functions of the corresponding components in FIG. 12A.

The STA memory 1220-*a* may store computer-readable, computer-executable software code containing instructions that are configured to, when executed, cause the STA processor 1210-*a* to perform various functions described herein for channel bonding. The STA memory 1220-*a* may include the STA bandwidth selector 1015-*c*, a STA communications manager 1230-*a*, and a STA segment parser 1235-*a*, which may perform the functions of the corresponding components in FIG. 12A. Alternatively, the STA bandwidth selector 1015-*c*, the STA communications manager 1230-*a*, and the STA segment parser 1235-*a* may not be directly executable by the STA processor 1210 but be configured to cause the computer (e.g., when compiled and executed) to perform functions described herein. The STA processor 1210-*a* may handle, alone or in connection with the STA bandwidth selector 1015-*c*, various related to channel bonding to support 80+80, 160, and 165 MHz bandwidth modes.

The components of the wireless device 110-*e* may be configured to implement aspects discussed above with respect to FIGS. 1-6, 10-11, and 12A, and those aspects may not be repeated here for the sake of brevity. Moreover, the components of the wireless device 110-*e* may be configured to implement aspects discussed below with respect to FIGS. 13 and 14, and those aspects may not be repeated here also for the sake of brevity.

Figure 13:
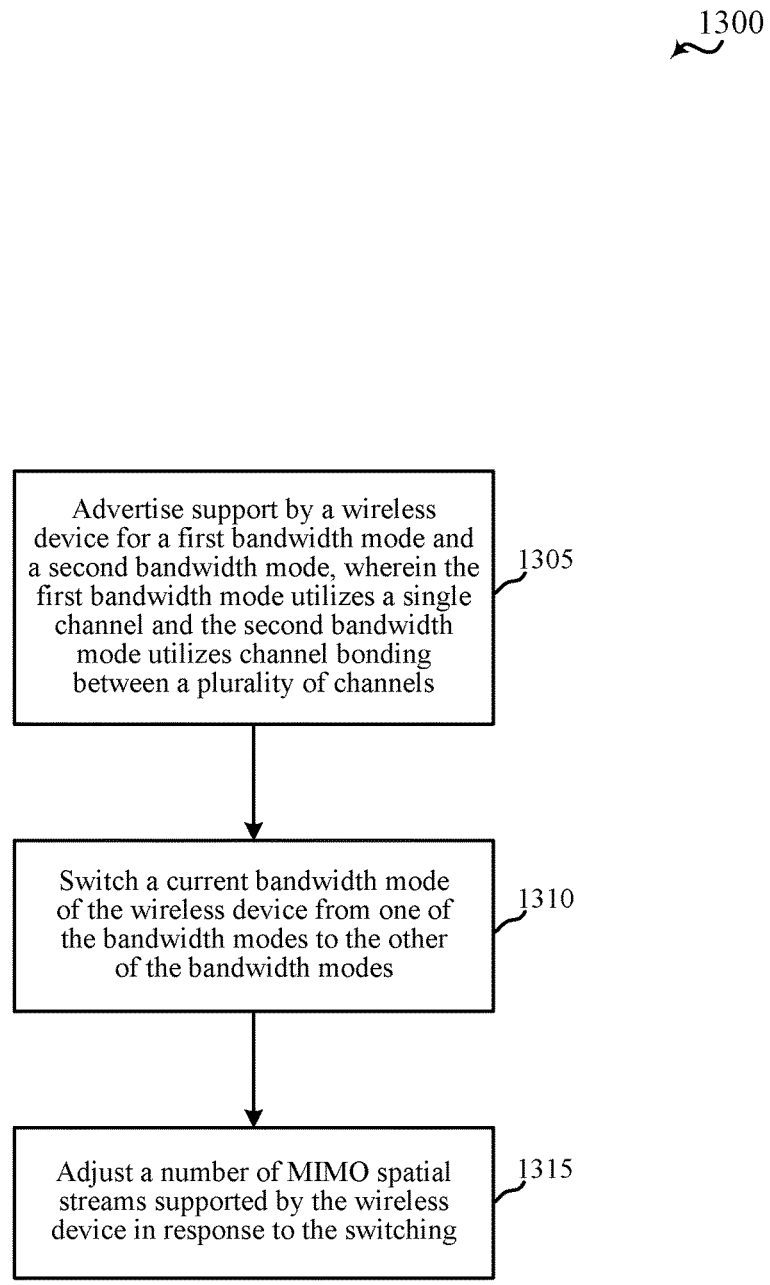
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the APs 105 or wireless devices 110 described with reference to FIGS. 1, 3-5, 9, and 12, or aspects of one or more of the wireless devices 705, 1005 described with reference to FIGS. 7, 8, 10, and 11. In some examples, an AP 105 or wireless device 110 may execute one or more sets of codes to control the functional elements of the AP 105 or wireless device 110 to perform the functions described below. Additionally or alternatively, the AP 105 or wireless device 110 may perform one or more of the functions described below using-purpose hardware. For illustrative purposes, FIG. 13 is discussed in terms of an AP 105. However, a wireless device 110 may also perform the functions described below.

At block 1305, the method 1300 may include advertising support by a wireless device for a first bandwidth mode and a second bandwidth mode, wherein the first bandwidth mode utilizes a single channel and the second bandwidth mode utilizes channel bonding between a plurality of channels. The AP 105 may advertise support for the bandwidth modes may be advertised by sending a bandwidth support message or a bandwidth identification message via a transmitter, such as the transmitter 600 of FIG. 6.

At block 1310, the method 1300 may include switching a current bandwidth mode of the wireless device from one of the bandwidth modes to the other of the bandwidth modes. In some examples, switching the current bandwidth mode of the wireless device includes switching from the first bandwidth mode to the second bandwidth mode. In other examples, switching the current bandwidth mode of the wireless device includes switching from the second bandwidth mode to the first bandwidth mode. In another example, adjusting the number of MIMO spatial streams includes increasing the number of MIMO spatial streams supported by the wireless device.

Advertising support by the wireless device for the first bandwidth mode and the second bandwidth mode may include signaling a response frame including an OMN element. The OMN element may indicate a parameter selected from the group consisting of an operating bandwidth of the single channel and the number of MIMO spatial streams supported by the wireless device. In some examples, the OMN element may indicate a reduced support of MIMO spatial streams than the number of spatial streams that the wireless device is capable of supporting. For example, if the wireless device has VHT capabilities and supports four spatial streams in the 160 MHz bandwidth mode, but a second wireless device to which it associates only supports two spatial streams in the 160 MHz bandwidth mode, the second wireless device may send an OMN to reduce its support to only two spatial streams in the 160 MHz bandwidth mode for communication with the wireless device.

At block 1315, the method 1300 may include adjusting a number of MIMO spatial streams supported by the wireless device in response to the switching. In some examples, adjusting the number of MIMO spatial streams may include reducing the number of MIMO spatial streams supported by the wireless device. For example, the AP 105 may reduce the number of MIMO spatial streams being used from four to two. In some examples, the number of MIMO spatial streams may be adjusted in proportion to an increase or decrease in bandwidth associated with switching the current bandwidth mode of the wireless device.

The method 1300 may further include adjusting sampling rates of one or more ADCs of the wireless device in response to the switching. The adjusted sampling rate may be done dynamically or statically. In a dynamic example, adjusting the sampling rates of the one or more ADCs may include doubling or halving the sampling rates in response to switching the current bandwidth mode from the first bandwidth mode to the second bandwidth mode. In a static example, the chains that may be needed to process the second channel (e.g., the secondary 80 MHz segment) could already be at double the sampling rate from the start of the data packet. In that case, when switching modes, the adjustment may include selecting the proper segment by means of mixing and filtering.

In some examples of the method 1300, switching the current bandwidth mode of the wireless device includes adjusting a number of synthesizers used by the wireless device.

The method 1300 may also include adjusting a number of receive chains used for the plurality of channels based on a listening mode or a data demodulation mode. In some examples, adjusting the number of receive chains includes one of increasing a number of receive chains used for a primary channel of the plurality of channels and decreasing a number of receive chains used for a secondary channel of the plurality of channels and decreasing the number of receive chains used for the primary channel and increasing the number of receive chains used for the secondary channel.

In examples where the method 1300 includes receiving a data packet at the wireless device, adjusting the number of receive chains used for the plurality of channels may be further based on a type of the data packet, a bandwidth of the data packet, or combinations thereof. In examples where the method 1300 includes receiving a data packet at the wireless device, switching the current bandwidth mode happens in one of a symbol after the wireless device determines a packet format of the data packet and in a symbol used for updating a gain level. For example, the method 1300 may perform the switching in a symbol after the packet format is known (e.g., after the HT-SIGs of 802.11n, or after the VHT-SIGs of 802.11ac). In another example, the method 1300 may perform the switching in a symbol used for updating the radio frequency or baseband gain (e.g., the HT-STF of 802.11n, or the VHT-STF of 802.11ac).

In some examples, a management message may indicate the listening mode to a physical layer. In some examples, the management message may be a MAC message. The method 1300 may include adjusting a configuration of a receiver based at least in part on an expected data packet type identified in the management message. For example, the configuration of the receiver of the wireless device for reception of an expected data packet type may be based on the management message.

The method 1300 may further include determining that an acknowledgement having a bandwidth equal to or less than a bandwidth of the single channel is expected at the wireless device from a different, second wireless device. The method 1300 may also include adjusting the number of received chains used for the single channel in response to the determination and based at least in part on a management message that indicates a number of receive chains used for the single channel to a physical layer or a number of frequency segments associated with the single channel.

The operation(s) at block 1305 may be performed using the AP bandwidth selector 715 or the STA bandwidth selector 1015 described with reference to FIGS. 7, 8, 10, and 11.

Thus, the method 1300 may provide for wireless communication. It should be noted that the method 1300 is just one implementation and that the operations of the method 1300 may be rearranged or otherwise modified such that other implementations are possible.

Figure 14:
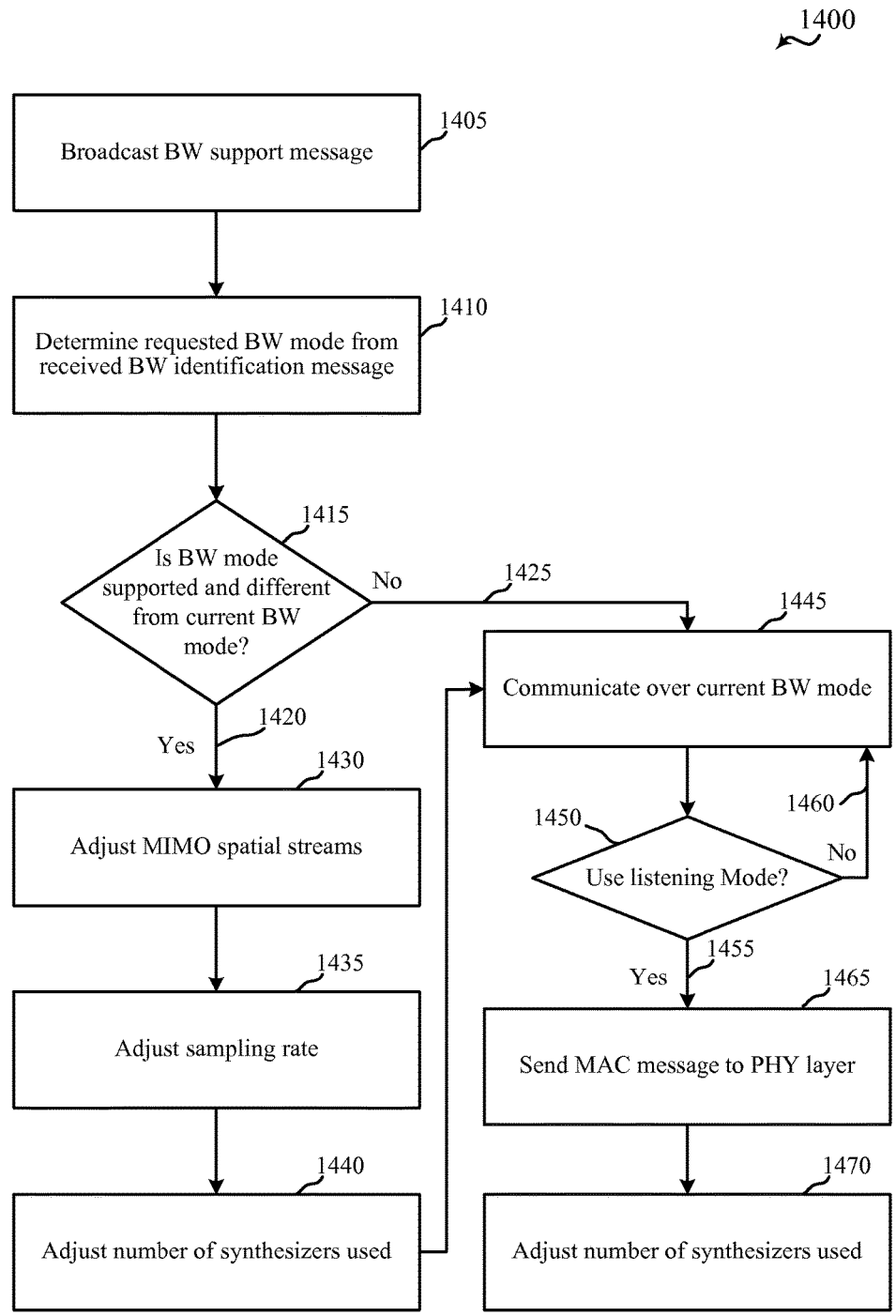
FIG. 14 is a flow chart illustrating an example of a method for wireless communication, in accordance with various aspects of the present disclosure.

FIG. 14 is a flow chart illustrating an example of a method for wireless communication, in accordance with various aspects of the present disclosure. For clarity, the method 1400 is described below with reference to aspects of one or more of the APs 105 or wireless devices 110 described with reference to FIGS. 1, 3-5, 9, and 12, or aspects of one or more of the wireless devices 705, 1005 described with reference to FIGS. 7, 8, 10, and 11. In some examples, an AP 105 or wireless device 110 may execute one or more sets of codes to control the functional elements of the AP 105 or wireless device 110 to perform the functions described below. Additionally or alternatively, the AP 105 or wireless device 110 may perform one or more of the functions described below using-purpose hardware. For illustrative purposes, FIG. 14 is discussed in terms of an AP 105. However, a wireless device 110 may also perform some or all of the functions described below.

At block 1405, the method 1400 may include broadcasting a bandwidth (BW) support message. The bandwidth support message may include an OMN element as described above.

At block 1410, the method 1400 may include determining a requested bandwidth mode from a bandwidth identification message that the AP 105 received. The AP 105 may be operating in a first bandwidth mode at the time the AP 105 received the bandwidth identification message from a client, such as a wireless device 110. At decision block 1415, the method 1400 may include determining whether the requested bandwidth mode is supported and different from bandwidth mode that the AP 105 is currently operating in or configured to. If the requested bandwidth mode is the same as the current bandwidth mode or if the AP 105 does not support the requested bandwidth mode, the method 1400 follows the path 1425 to block 1445. At block 1445, the method 1400 may include communicating with the requesting device over the current bandwidth mode, which in this case, is the same as the previous bandwidth mode. In some examples, the method 1400 may not communicate with the requesting device over the current bandwidth mode if, for example, the requesting device does not support the current bandwidth mode.

If the requested bandwidth mode is not the same as the current bandwidth mode and the AP 105 supports the requested bandwidth mode, the method 1400 proceeds along path 1420 to block 1430. For blocks 1430, 1435, and 1440, the method 1400 performs steps for changing the current bandwidth mode to the requested bandwidth mode. At block 1430, the method 1400 may include adjusting the MIMO spatial streams of the AP 105. For example, the AP 105 may reduce the spatial streams used from four to two. At block 1435, the method 1400 may adjust the sampling rate of DACs in the one or more transceivers. At block 1440, the method 1400 may adjust the number of synthesizers used in the one or more transceivers. In some examples, the method 1400 includes a subset of the blocks 1430, 1435, and 1440.

Once the AP 105 is operating in the requested bandwidth mode, which is now the current bandwidth mode, the method 1400 proceeds to block 1445 where the AP 105 communicates with the requesting wireless device 110 via the current (i.e., requested) bandwidth mode.

At block 1450, the method 1400 includes querying whether the AP 105 should use a listening mode. If not, the method 1400 continues to communicate with the requesting wireless device 110 along path 1460. If so, the method 1400 further proceeds along path 1455 to include sending a MAC message to a PHY layer to inform the PHY layer to adjust for the listening mode. At block 1470, the method 1400 may adjust the number of synthesizers used in order use the listening mode. In some examples, the method 1400 may continue to communicate with the requesting wireless device 110 over the current bandwidth mode.

Aspects from two or more of the methods 1300 and 1400 may be combined. It should be noted that the methods 1300 and 1400 are just example implementations, and that the operations of the methods 1300 and 1400 may be rearranged or otherwise modified such that other implementations are possible.

The detailed description set forth above in connection with the appended drawings describes examples and does not represent the only examples that may be implemented or that are within the scope of the claims. The term "example" when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   signaling an association response frame including an operating mode notification (OMN) element that indicates support by a wireless device for a first bandwidth mode and a second bandwidth mode and that indicates a number of supported multiple-input, multiple-output (MIMO) spatial streams, wherein the first bandwidth mode utilizes a single channel and the second bandwidth mode utilizes channel bonding between a plurality of channels;
   switching a current bandwidth mode of the wireless device from one of the bandwidth modes to the other of the bandwidth modes;

adjusting a number of MIMO spatial streams supported by the wireless device in response to the switching; and
adjusting a number of receive chains used for the plurality of channels based on a listening mode or a data demodulation mode.

2. The method of claim 1, wherein:
switching the current bandwidth mode of the wireless device comprises switching from the first bandwidth mode to the second bandwidth mode; and
adjusting the number of MIMO spatial streams comprises reducing the number of MIMO spatial streams supported by the wireless device.

3. The method of claim 1, wherein:
switching the current bandwidth mode of the wireless device comprises switching from the second bandwidth mode to the first bandwidth mode; and
adjusting the number of MIMO spatial streams comprises increasing the number of MIMO spatial streams supported by the wireless device.

4. The method of claim 1, wherein the number of MIMO spatial streams is adjusted in proportion to an increase or decrease in bandwidth associated with switching the current bandwidth mode of the wireless device.

5. The method of claim 1, further comprising:
adjusting sampling rates of one or more analog-to-digital converters (ADCs) of the wireless device in response to the switching.

6. The method of claim 5, wherein:
adjusting the sampling rates of the one or more ADCs comprises doubling the sampling rates in response to switching the current bandwidth mode from the first bandwidth mode to the second bandwidth mode; and
adjusting the sampling rates of the one or more ADCs comprises halving the sampling rates in response to switching the current bandwidth mode from the second bandwidth mode to the first bandwidth mode.

7. The method of claim 1, wherein:
switching the current bandwidth mode of the wireless device comprises adjusting a number of synthesizers used by the wireless device.

8. The method of claim 1, wherein:
adjusting the number of receive chains comprises one of:
increasing a number of receive chains used for a primary channel of the plurality of channels and decreasing a number of receive chains used for a secondary channel of the plurality of channels; and
decreasing the number of receive chains used for the primary channel and increasing the number of receive chains used for the secondary channel.

9. The method of claim 1, further comprising:
receiving a data packet at the wireless device wherein switching the current bandwidth mode occurs in one of a symbol after the wireless device determines a packet format of the data packet and in a symbol used for updating a gain level.

10. The method of claim 1, wherein a management message indicates the listening mode to a physical layer (PHY), further comprising:
adjusting a configuration of a receiver of the wireless device for reception of an expected data packet type based on the management message.

11. The method of claim 1, wherein the wireless device is a first wireless device, further comprising:
determining that an acknowledgement having a bandwidth equal to or less than a bandwidth of the single channel is expected at the first wireless device from a second wireless device; and
adjusting a number of receive chains used for the single channel in response to the determination and based on a management message to a physical layer (PHY) that indicates a parameter from the group consisting of: the number of receive chains used for the single channel and a number of frequency segments associated with a listen mode.

12. The method of claim 1, wherein:
the OMN element indicates a parameter indicating an operating bandwidth.

13. An apparatus for wireless communication, comprising:
a transceiver to signal an association response frame including an operating mode notification (OMN) element that indicates support by a wireless device for a first bandwidth mode and a second bandwidth mode and that indicates a number of supported multiple-input, multiple-output (MIMO) spatial streams, wherein the first bandwidth mode utilizes a single channel and the second bandwidth mode utilizes channel bonding between a plurality of channels;
a bandwidth selector to switch a current bandwidth mode of the wireless device from one of the bandwidth modes to the other of the bandwidth modes and to adjust a number of receive chains used for the plurality of channels based on a listening mode or a data demodulation mode; and
a spatial stream component to adjust a number of MIMO spatial streams supported by the wireless device in response to the switching.

14. The apparatus of claim 13, wherein:
switching the current bandwidth mode of the wireless device comprises switching from the first bandwidth mode to the second bandwidth mode; and
adjusting the number of MIMO spatial streams comprises reducing the number of MIMO spatial streams supported by the wireless device.

15. The apparatus of claim 13, wherein:
switching the current bandwidth mode of the wireless device comprises switching from the second bandwidth mode to the first bandwidth mode; and
adjusting the number of MIMO spatial streams comprises increasing the number of MIMO spatial streams supported by the wireless device.

16. The apparatus of claim 13, wherein the number of MIMO spatial streams is adjusted in proportion to an increase or decrease in bandwidth associated with switching the current bandwidth mode of the wireless device.

17. The apparatus of claim 13, wherein the bandwidth selector is further to adjust sampling rates of one or more analog-to-digital converters (ADCs) of the wireless device in response to the switching.

18. The apparatus of claim 17, wherein the bandwidth selector is further to adjust a number of synthesizers used by the wireless device in response to the switching.

19. The apparatus of claim 13, wherein the transceiver is further to receive a data packet at the wireless device, and wherein switching the current bandwidth mode occurs in one of a symbol after the wireless device determines a packet format of the data packet and in a symbol used for updating a gain level.

20. The apparatus of claim 13, wherein the bandwidth selector is further to indicate the listening mode to a physical layer of the wireless device via a management message, wherein the transceiver is adjusted for reception of an expected data packet type based on the management message.

21. The apparatus of claim 13, wherein the wireless device is a first wireless device, and wherein the bandwidth selector is further to:
determine that an acknowledgement having a bandwidth equal to or less than a bandwidth of the single channel is expected at the first wireless device from a second wireless device; and
adjust a number of receive chains used for the single channel in response to the determination and based on a management message to a physical layer (PHY) that indicates a parameter from the group consisting of: the number of receive chains used for the single channel and a number of frequency segments associated with the listen mode.

22. The apparatus of claim 13, wherein:
the OMN element indicates a parameter indicating an operating bandwidth of the single channel and the number of MIMO spatial streams supported by the wireless device.

23. An apparatus for wireless communication, comprising:
means for signaling an association response frame including an operating mode notification (OMN) element that indicates support by a wireless device for a first bandwidth mode and a second bandwidth mode and that indicates a number of supported multiple-input, multiple-output (MIMO) spatial streams, wherein the first bandwidth mode utilizes a single channel and the second bandwidth mode utilizes channel bonding between a plurality of channels;
means for switching a current bandwidth mode of the wireless device from one of the bandwidth modes to the other of the bandwidth modes;
means for adjusting a number of MIMO spatial streams supported by the wireless device in response to the switching and
means for adjusting a number of receive chains used for the plurality of channels based on a listening mode or a data demodulation mode.

24. The apparatus of claim 23, further comprising:
means for adjusting sampling rates of one or more analog-to-digital converters (ADCs) of the wireless device in response to the switching.

25. The apparatus of claim 23, wherein the means for switching the current bandwidth mode of the wireless device comprises:
means for adjusting a number of synthesizers used by the wireless device.

26. A non-transitory computer-readable medium storing computer-executable code for wireless communication, the code executable by a processor to cause a wireless device to:
signal an association response frame including an operating mode notification (OMN) element that indicates support by a wireless device for a first bandwidth mode and a second bandwidth mode and that indicates a number of supported multiple-input, multiple-output (MIMO) spatial streams, wherein the first bandwidth mode utilizes a single channel and the second bandwidth mode utilizes channel bonding between a plurality of channels;
switch a current bandwidth mode of the wireless device from one of the bandwidth modes to the other of the bandwidth modes;
adjust a number of MIMO spatial streams supported by the wireless device in response to the switching and
adjust a number of receive chains used for the plurality of channels based on a listening mode or a data demodulation mode.

* * * * *